(12) United States Patent
Sako et al.

(10) Patent No.: US 9,501,633 B2
(45) Date of Patent: Nov. 22, 2016

(54) INFORMATION PROCESSING DEVICE, INFORMATION PROCESSING METHOD, AND COMPUTER PROGRAM

(71) Applicant: Sony Corporation, Tokyo (JP)

(72) Inventors: Yoichiro Sako, Tokyo (JP); Motoyuki Takai, Tokyo (JP); Masashi Takeda, Tokyo (JP); Yasushi Miyajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 68 days.

(21) Appl. No.: 14/063,422

(22) Filed: Oct. 25, 2013

(65) Prior Publication Data

US 2014/0130148 A1  May 8, 2014

(30) Foreign Application Priority Data

Nov. 2, 2012  (JP) ................. 2012-243185

(51) Int. Cl.
| | | |
|---|---|---|
| G06F 21/00 | (2013.01) | |
| G06F 21/36 | (2013.01) | |
| G06F 21/32 | (2013.01) | |
| G06F 21/44 | (2013.01) | |
| G06F 3/01 | (2006.01) | |
| G06F 3/14 | (2006.01) | |

(52) U.S. Cl.
CPC ............ *G06F 21/36* (2013.01); *G06F 3/013* (2013.01); *G06F 3/14* (2013.01); *G06F 21/32* (2013.01); *G06F 21/44* (2013.01); *G06F 2221/2123* (2013.01)

(58) Field of Classification Search
None
See application file for complete search history.

(56) References Cited

U.S. PATENT DOCUMENTS

| | | | |
|---|---|---|---|
| 6,546,114 B1 * | 4/2003 | Venkatesan | G06T 1/005 382/100 |
| 2008/0062291 A1 * | 3/2008 | Sako et al. | 348/294 |
| 2009/0320124 A1 * | 12/2009 | Taxier | G06F 21/36 726/17 |
| 2013/0036461 A1 * | 2/2013 | Lowry | 726/19 |
| 2013/0251212 A1 * | 9/2013 | Leddy | 382/115 |
| 2014/0050370 A1 * | 2/2014 | Inkumsah et al. | 382/117 |

FOREIGN PATENT DOCUMENTS

| | | |
|---|---|---|
| JP | 06-318186 | 11/1994 |
| JP | 2012-088715 A | 5/2012 |
| JP | 2012-141461 A | 7/2012 |

* cited by examiner

*Primary Examiner* — Hadi Armouche
*Assistant Examiner* — Andrew Steinle
(74) *Attorney, Agent, or Firm* — Chip Law Group

(57) ABSTRACT

An information processing device includes a display that displays an input screen including a plurality of images, an image selecting section that selects at least one image within the input screen in accordance with an input operation from a user, and a controller that controls the information processing device on a basis of the image selected by the image selecting section.

19 Claims, 13 Drawing Sheets

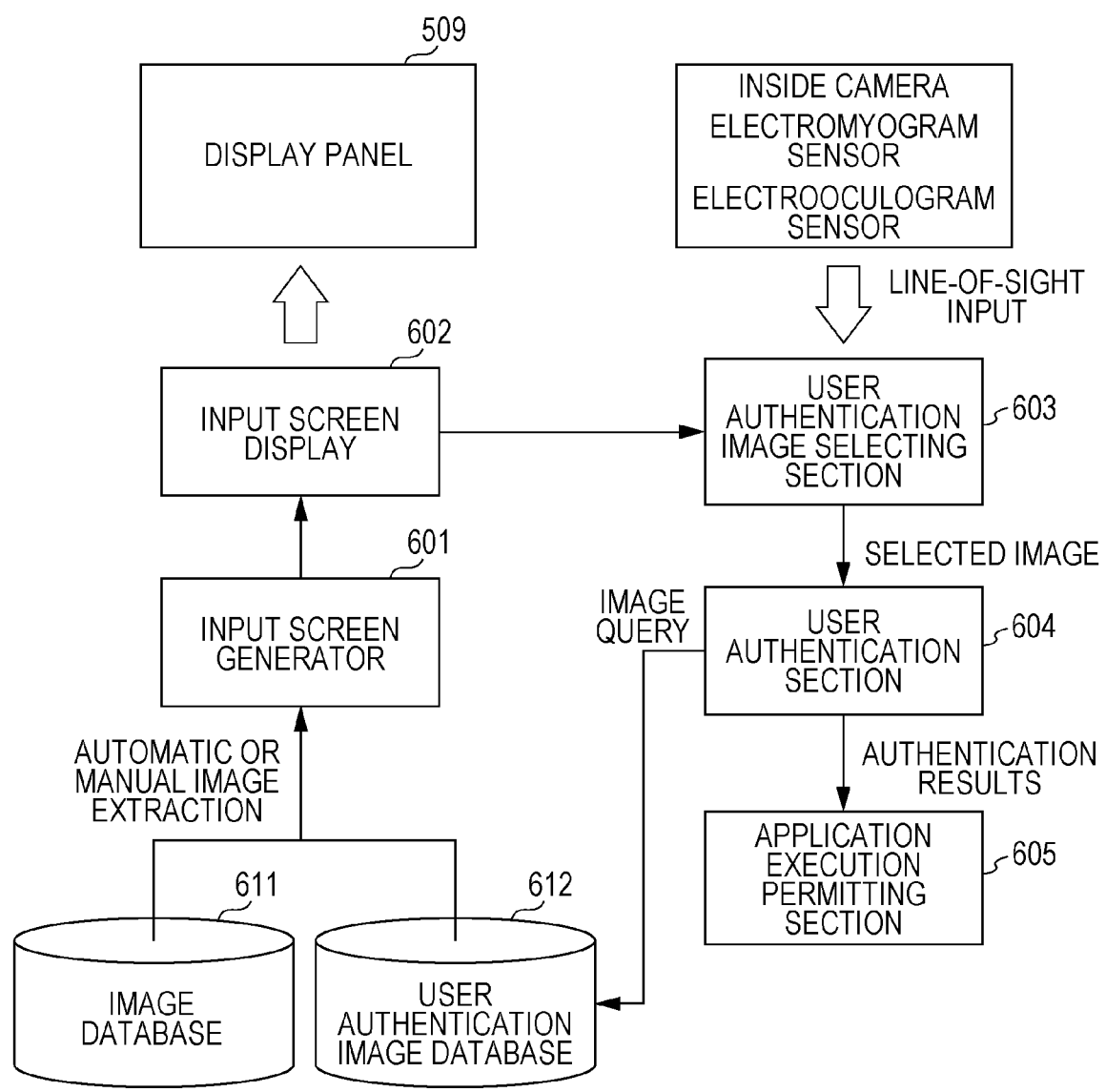

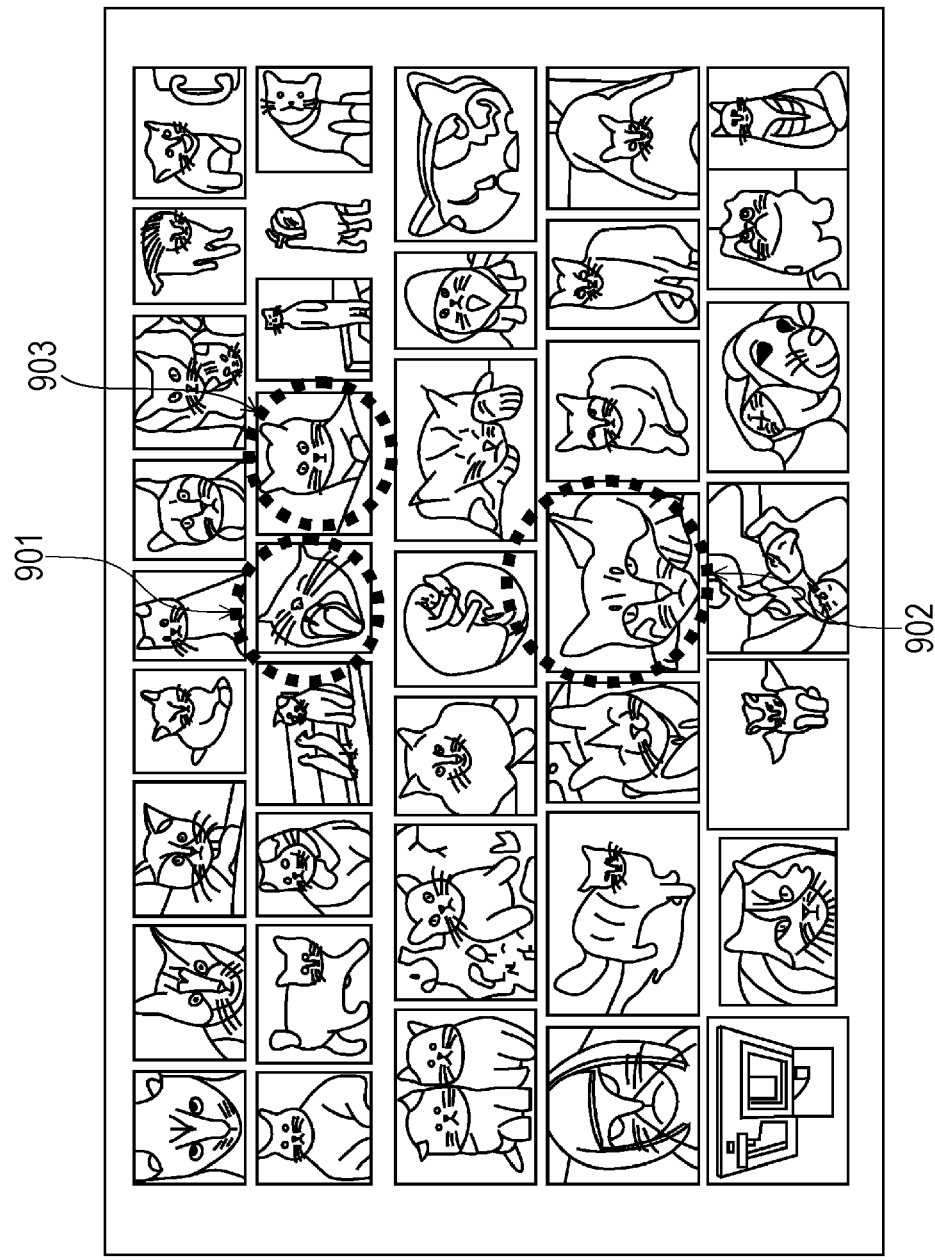

INFORMATION PROCESSING DEVICE, INFORMATION PROCESSING METHOD, AND COMPUTER PROGRAM

CROSS REFERENCE TO RELATED APPLICATIONS

This application claims the benefit of priority under 35 U.S.C. §119 from Japanese Priority Patent Application JP 2012-243185 filed Nov. 2, 2012, the entire contents of which are incorporated herein by reference.

BACKGROUND OF THE INVENTION

The technology disclosed in this specification relates to an information processing device, an information processing method, and a computer program, which perform user authentication at the start of use of the information processing device, for example.

Currently, various types of information processing devices have been developed and come into widespread use. Examples of such information processing devices include multi-function terminals such as personal computers (PCs), tablets, and smartphones, and head-mounted displays that are worn on the user's head or face. Many of these information processing devices are intended for regular use by users in their daily lives and, as a result, these information processing devices store various information such as secret information. Accordingly, greater importance is attached to security control, such as checking user's authenticity at the start of use of an information processing device.

In the field of information processing, authentication methods based on input of personal identification numbers or passwords are in widespread use. For example, when starting a transaction or logging in to a system, a user enters a string of letters that serves as a personal identification number or a password with a ten key or a touch panel. However, if the input operation is exposed to the outside world, there is a risk of the inputted information being discovered by a third person who is behind or near the user. Further, people tend to forget a personal identification number or password that is made up of a meaningless string of random letters, and if the personal identification number or password is written down somewhere, there is a risk that such information may leak.

There exists a technology which moves or changes the arrangement of numeric keys in order to prevent a personal identification number from being peeped at from behind the user, or prevent a personal identification number from being discovered from the user's movement/posture (see, for example, Japanese Unexamined Patent Application Publication No. 6-318186). However, the proposed process proves cumbersome since it is necessary for the user to find out the location of a numeric key the user wants to enter anew immediately after updating the arrangement of numeric keys.

Authentication systems that verify the identity of a user on the basis of biometric information such as the iris or retina of the user are widely used in this field. However, in order to read information about biological features such as the iris or retina from the user, expensive devices specifically designed for that purpose are necessary. Incorporating this type of authentication device into information apparatuses intended for regular use by the user in their daily lives results in many disadvantages in terms of cost. In addition, devices for reading the iris, retina, or the like have hardly any uses other than authentication, and once authentication is established, there will be no chance whatsoever of these devices being utilized for day-to-day execution of applications.

BRIEF SUMMARY OF THE INVENTION

It is desirable to provide an information processing device, an information processing method, and a computer program, which allow user authentication to be performed securely without being discovered by a third person at the start of use of the information processing device, for example.

According to an embodiment of the present disclosure, there is provided an information processing device including a display that displays an input screen including a plurality of images, an image selecting section that selects at least one image within the input screen in accordance with an input operation from a user, and a controller that controls the information processing device on a basis of the image selected by the image selecting section.

According to an embodiment of the present disclosure, in the information processing device, each of the plurality of images included in the input screen is one of: a photograph of a person, living being, or building; a static image; a piece of computer graphics; a piece of animation; and a moving image.

According to an embodiment of the present disclosure, in the information processing device, the input screen includes a user authentication image and an image other than the user authentication image. A user authentication image is, for example, an image that is familiar to the user, and another image included in the input screen is, for example, an image that is not familiar to the user and has low relevance to the user.

According to an embodiment of the present disclosure, in the information processing device, the user authentication image is one of: an image of a friend, acquaintance, or relative of the user; an image of a person the user likes, the person including a person in history or a fictitious person; and an image of another person related to the user.

According to an embodiment of the present disclosure, in the information processing device, the user authentication image is one of: an image of a pet or ornamental plant of the user; an image of an animal or plant the user likes, the animal or plant including a fictitious living being; and an image of a living being related to the user.

According to an embodiment of the present disclosure, in the information processing device, the user authentication image is one of: an image of a house of the user, a school the user went to, or an office of the user; an image of a building the user likes, the building including a fictitious building; and an image of a building related to the user.

According to an embodiment of the present disclosure, in the information processing device, the input screen includes a group photograph including the user authentication image.

According to an embodiment of the present disclosure, in the information processing device, the input screen includes a group photograph that is partially replaced with the user authentication image.

According to an embodiment of the present disclosure, the display of the information processing device controls a location in which to place or a size in which to display the user authentication image within the input screen.

According to an embodiment of the present disclosure, the display of the information processing device controls a location in which to place or a size in which to display the user authentication image within the input screen, by a random number.

According to an embodiment of the present disclosure, in the information processing device, the user authentication image within the input screen is marked. Further, the controller determines whether or not the image selected by the image selecting section is the user authentication image on a basis of whether or not the image is marked.

According to an embodiment of the present disclosure, the information processing device further includes an input screen generator that generates the input screen.

According to an embodiment of the present disclosure, the input screen generator of the information processing device generates the input screen by combining the plurality of images including the user authentication image.

According to an embodiment of the present disclosure, the input screen generator of the information processing device generates the input screen by marking at least one of the plurality of images as the user authentication image.

According to an embodiment of the present disclosure, the information processing device is configured to perform authentication of the user by repeatedly attempting displaying of the input screen by the display, selecting of the image by the image selecting section, and determining of the user authentication image by the controller a predetermined number of times.

According to an embodiment of the present disclosure, the information processing device is used by the user by wearing the information processing device on a head or face of the user.

According to an embodiment of the present disclosure, the image selecting section of the information processing device selects the image from the input screen on a basis of an input of line of sight of the user.

According to an embodiment of the present disclosure, there is provided an information processing method including displaying an input screen including a plurality of images, selecting at least one image within the input screen in accordance with an input operation from a user, and controlling operation of an information processing device on a basis of the selected image.

According to an embodiment of the present disclosure, there is provided a computer program which is described in a computer-readable format, the computer program causing a computer to function as a display that displays an input screen including a plurality of images, an image selecting section that selects at least one image within the input screen in accordance with an input operation from a user, and a controller that controls an information processing device on a basis of the image selected by the image selecting section.

The computer program according to an embodiment of the present disclosure defines a computer program that is described in a computer-readable format in order to implement predetermined processing on a computer. In other words, by installing the computer program according to an embodiment of the present disclosure to the computer, synergistic operation is exerted on the computer, making it possible to obtain the same operational effect as that of the information processing device according to an embodiment of the present disclosure.

According to the technology disclosed in this specification, it is possible to provide an information processing device, an information processing method, and a computer program, which allow user authentication to be performed securely without being discovered by a third person at the start of use of the information processing device, for example.

According to the technology disclosed in this specification, it is possible to provide an information processing device, an information processing method, and a computer program, which allow user authentication to be performed securely without being discovered by a third person, by means of a simpler and less expensive method.

Other objects, features, and advantages of the technology disclosed in this specification will become apparent from the following detailed description of embodiments of the technology disclosed in this specification and the accompanying drawings.

BRIEF DESCRIPTION OF THE DRAWINGS

FIG. 6 schematically shows a functional configuration for the image display device to perform a user authentication process by using an input screen;

FIG. 9 shows an example of display of an input screen including a combination of images of animals;

DETAILED DESCRIPTION

Hereinafter, embodiments of the technology disclosed in this specification as applied to a head-mounted image display device will be described in detail with reference to the drawings.

A. Device Configuration

Figure 1:
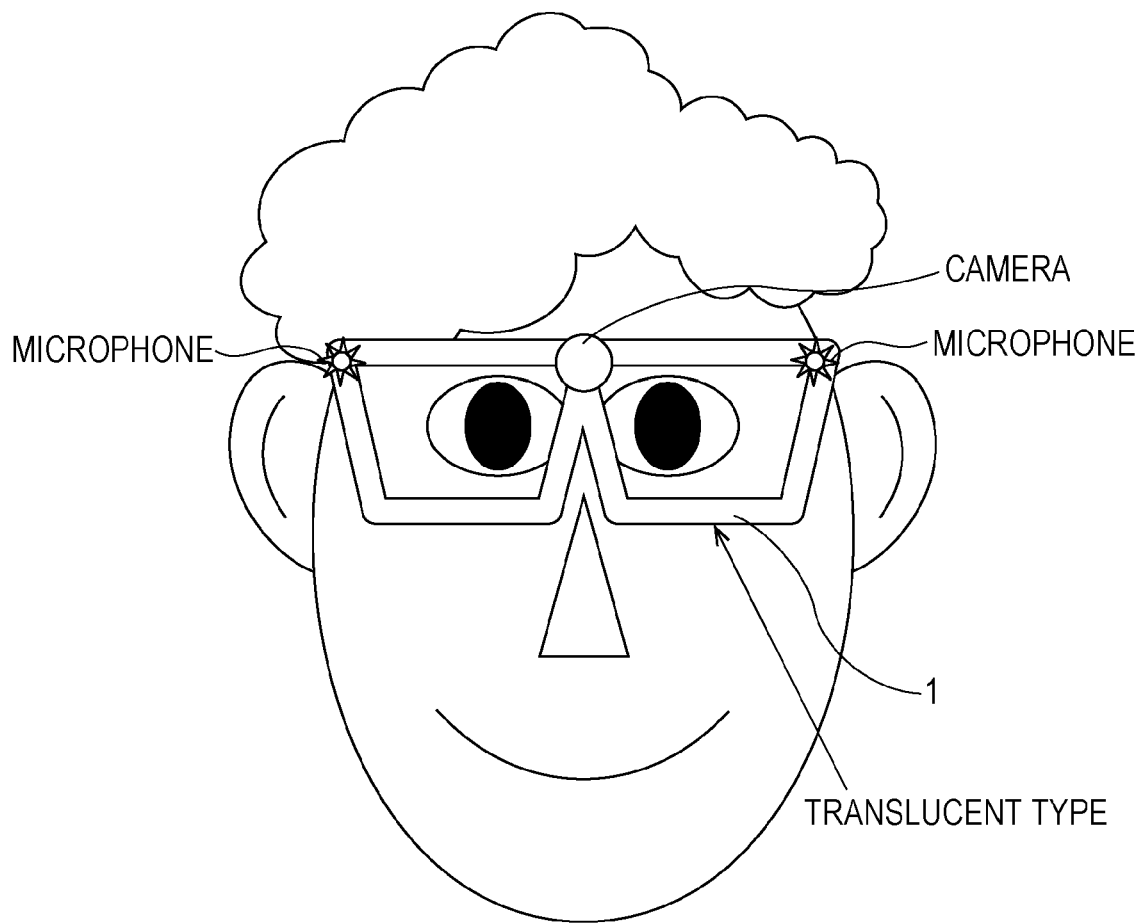
FIG. 1 is a view, as seen from the front, of a user wearing an image display device of a translucent head-mounted type.

FIG. 1 is a view, as seen from the front, of a user wearing an image display device of a translucent, that is, see-through head-mounted type. The image display device 1 shown in FIG. 1 has a structure similar to glasses used for eyesight correction. A virtual image optical section configured by a transparent light guide section or the like is disposed at a position on the main body of the image display device 1 opposite to each of the user's left and right eyes. An image observed by the user is displayed inside the virtual image optical section. The virtual image optical section is supported by, for example, a support shaped like a glasses frame.

A camera for ambient image (user's view) input is installed at substantially the center of the support shaped like a glasses frame. In addition, microphones are installed near the left and right ends of the support. The presence of two microphones means that only the sound (user's voice) that is localized in the middle between the two microphones is recognized, thereby making it possible to isolate the sound from ambient noise or other people's speech, which in turn makes it possible to prevent, for example, malfunction during operation based on voice input.

Figure 2:
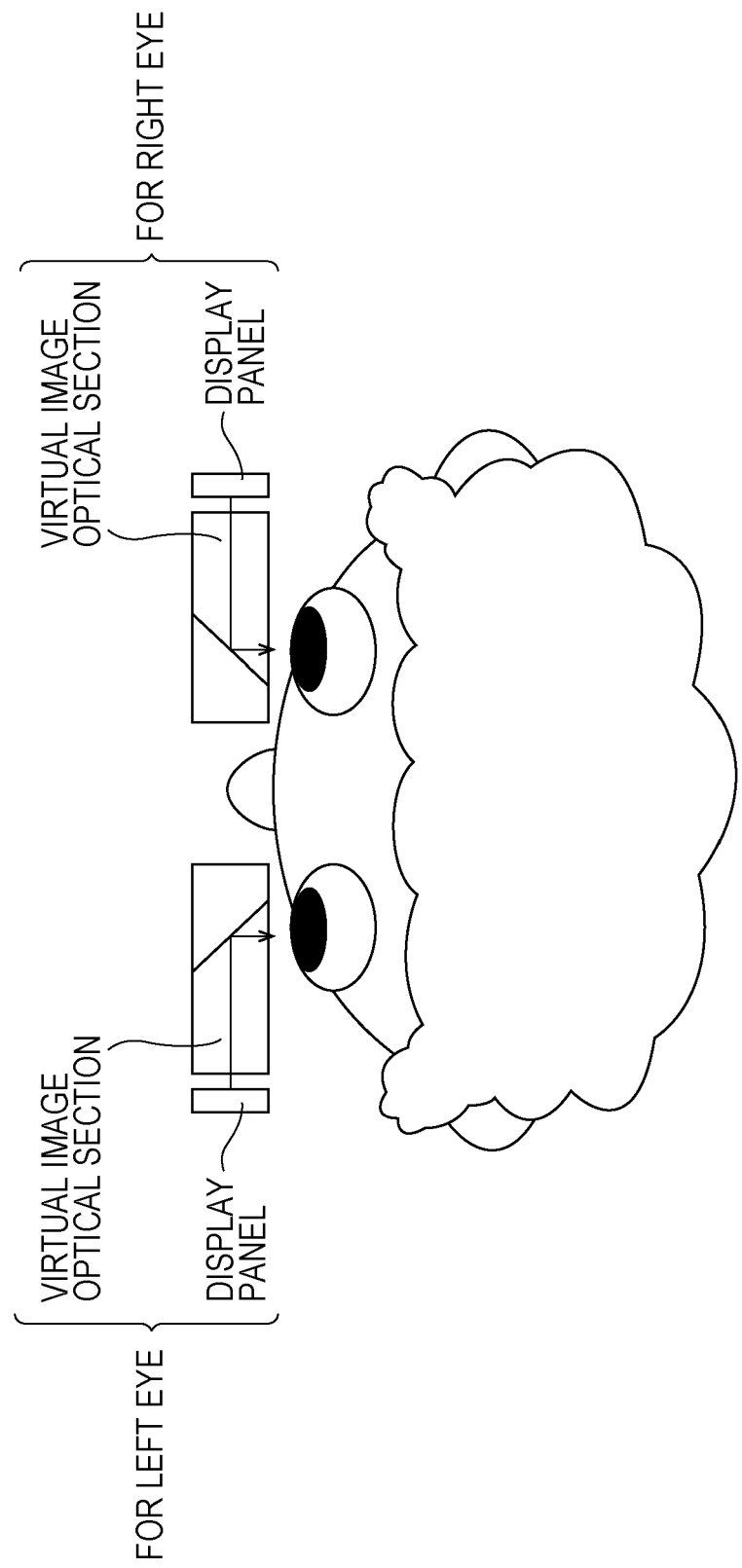
FIG. 2 is a view, as seen from above, of the user wearing the image display device shown in FIG. 1.

FIG. 2 is a view, as seen from above, of the image display device 1 when worn on the user. As shown in FIG. 2, display panels that display/output left-eye and eight-eye images are disposed at the left and right ends of the image display device 1, respectively. Each of the display panels is configured by, for example, a micro display such as a liquid crystal display or an organic EL element. The left and right display images outputted from the display panels are guided to positions near the left and right eyes, respectively, by the virtual image optical section, and an enlarged virtual image of each of the left and right display images is formed on the pupil of the user.

Figure 3:
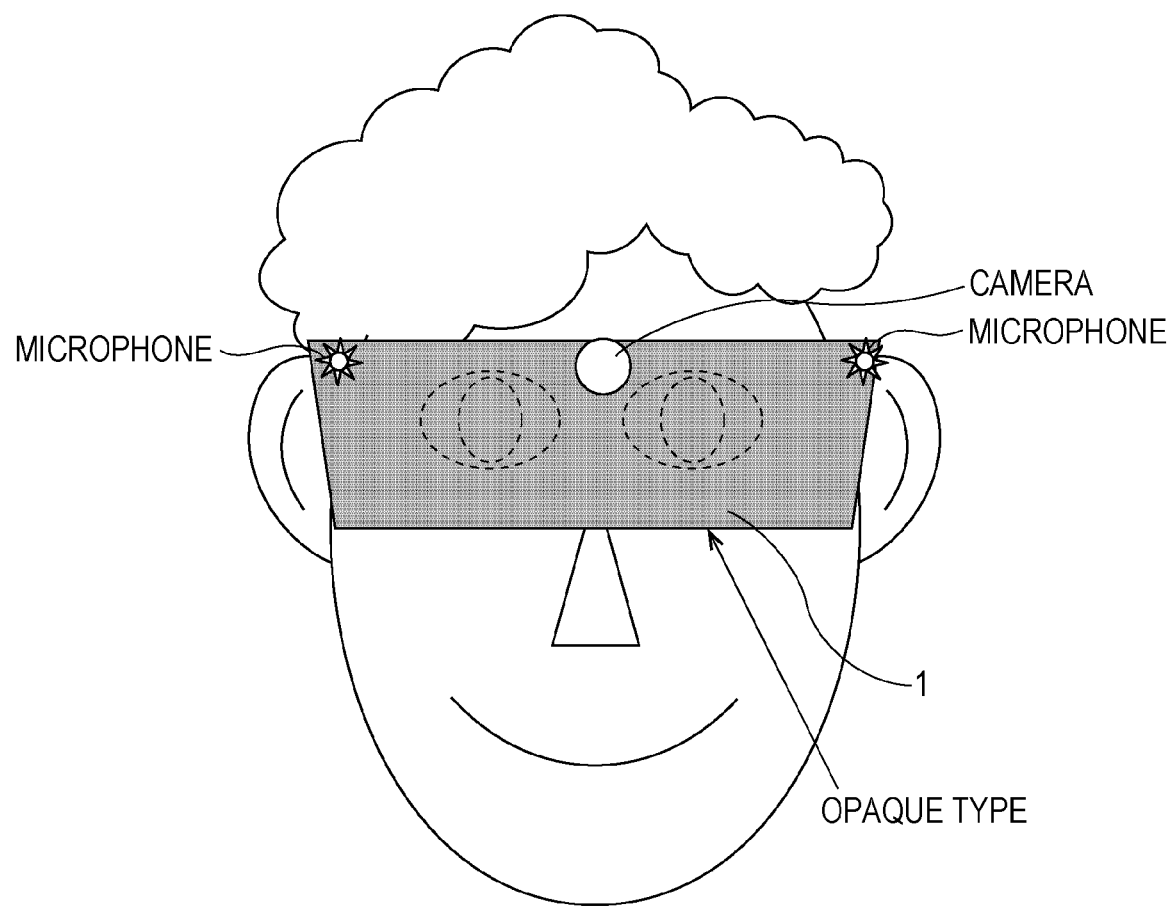
FIG. 3 is a view, as seen from the front, of a user wearing the image display device of an opaque head-mounted type.

FIG. 3 is a view, as seen from the front, of a user wearing the image display device 1 of an opaque head-mounted type. The image display device 1 shown in FIG. 3 is a structure that is similar in shape to a hat. The image display device 1 directly covers the left and right eyes of the user wearing the image display device 1. Display panels (not shown in FIG. 3) observed by the user are disposed at positions on the inside of the main body of the image display device 1 opposite to the left and right eyes. Each of the display panels is configured by, for example, a micro display such as an organic EL element or a liquid crystal display.

A camera for ambient image (user's view) input is installed at substantially the center of the front surface of the main body of the image display device 1 which has a shape similar to a hat. In addition, microphones are installed near the left and right ends of the main body of the image display device 1. The presence of two microphones means that only the sound (user's voice) that is localized in the middle between the two microphones is recognized, thereby making it possible to isolate the sound from ambient noise or other people's speech, which in turn makes it possible to prevent, for example, malfunction during operation based on voice input.

Figure 4:
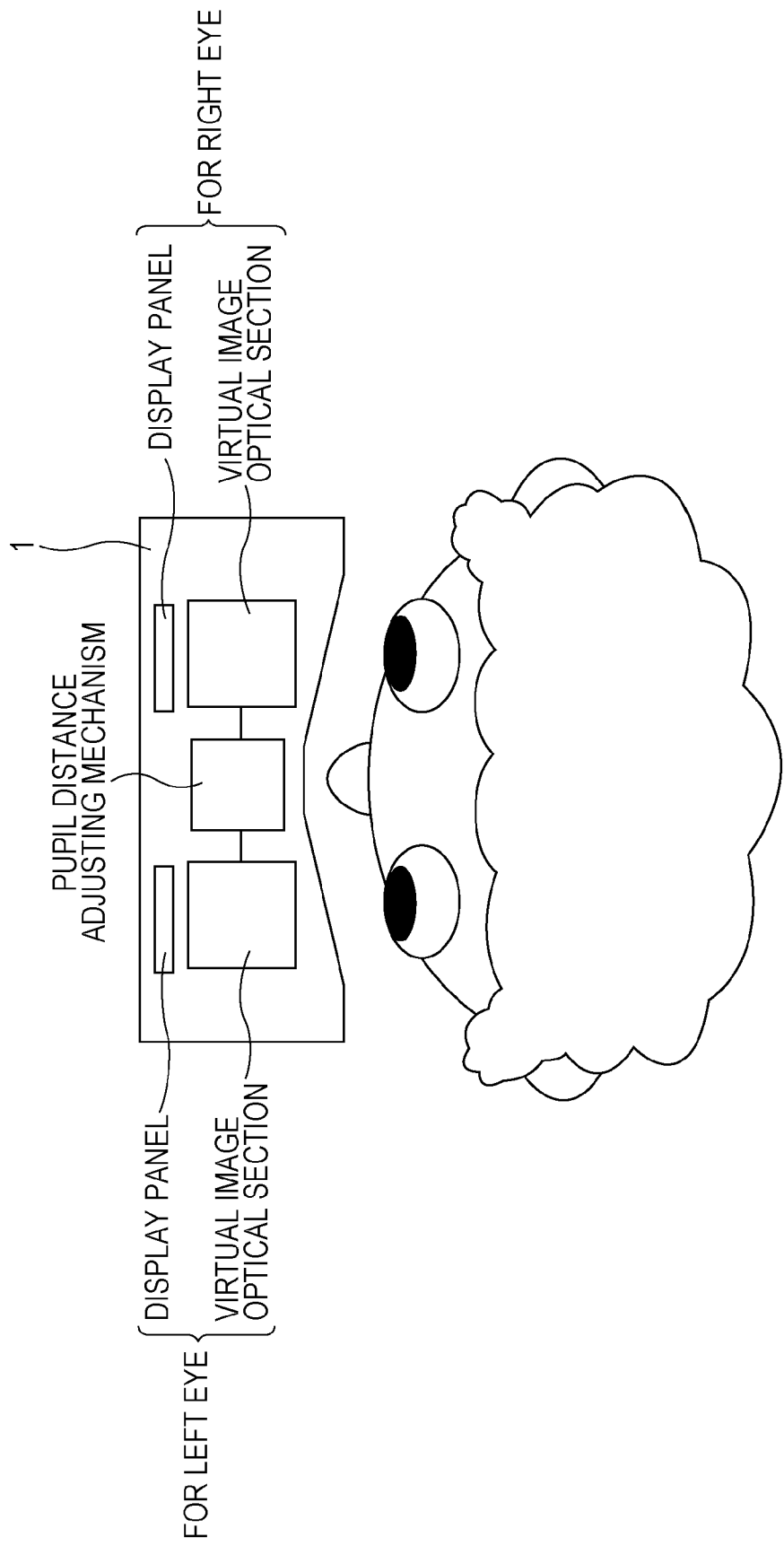
FIG. 4 is a view, as seen from above, of the user wearing the image display device shown in FIG. 3.

FIG. 4 is a view, as seen from above, of the user wearing the image display device 1 shown in FIG. 3. The image display device 1 shown in FIG. 4 has display panels for left and right eyes on side surfaces opposite to the user's face. Each of the display panels is configured by, for example, a micro display such as an organic EL element or a liquid crystal display. As an image displayed on each of the display panels passes through a virtual image optical section, the image is observed by the user as an enlarged virtual image. Since the height of the eyes and pupil distance are subject to individual differences among users, it is necessary to align the left and right display systems with the user's eyes. In the example shown in FIG. 4, the image display device 1 is equipped with a pupil distance adjusting mechanism that is located between the display panel for the right eye and the display panel for the left eye.

Figure 5:
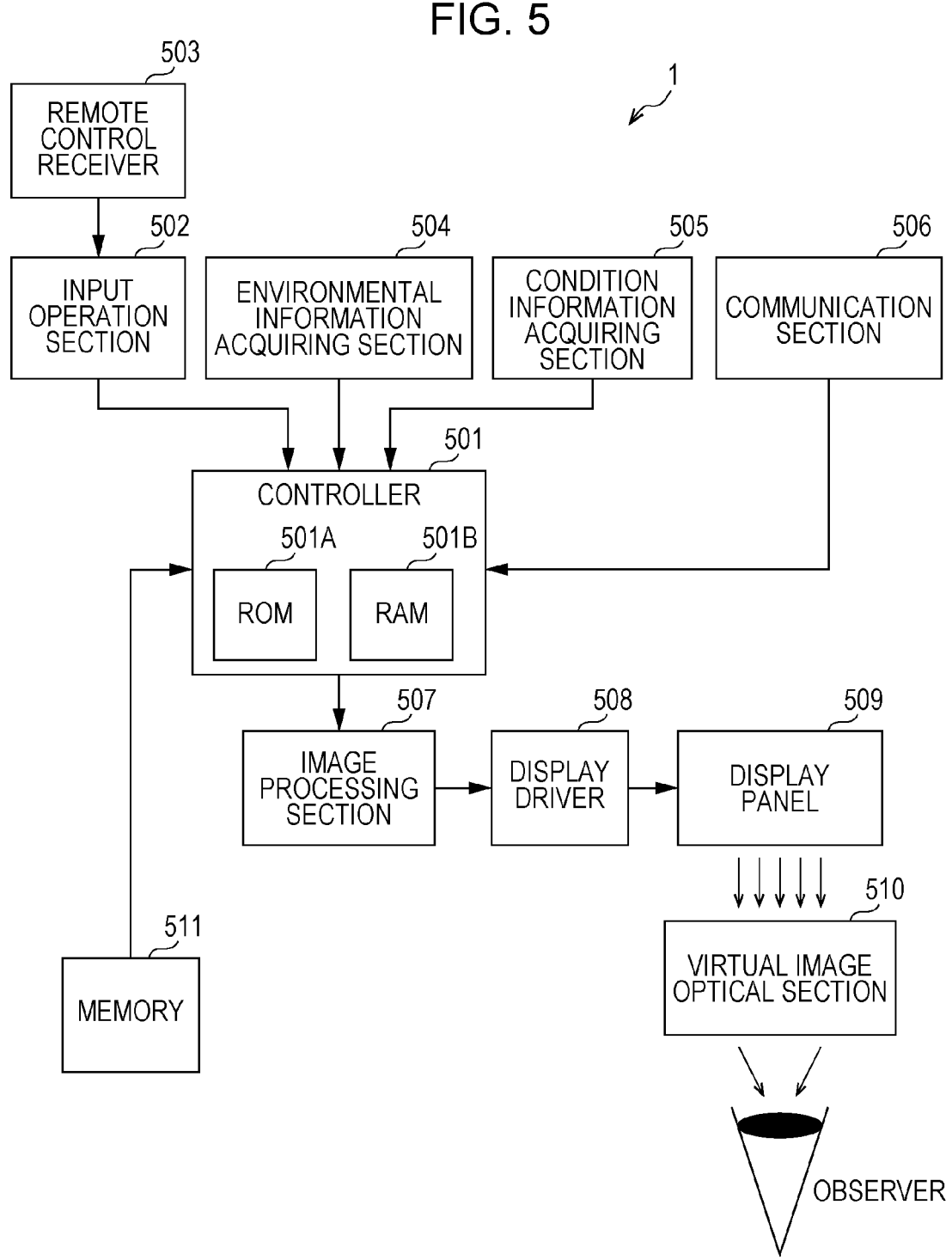
FIG. 5 shows an example of the internal configuration of the image display device.

FIG. 5 shows an example of the internal configuration of the image display device 1. Hereinafter, various sections of the image display device 1 will be described.

A controller 501 includes a read only memory (ROM) 501A and a random access memory (RAM) 501B. Program codes and various data executed by the controller 501 are stored in the ROM 501A. By executing programs loaded into the ROM 501B, the controller 501 controls the overall operation of the image display device 1 in a centralized manner, including control of playback of content to be displayed on a display panel 509. Examples of programs executed by the controller 501 include, in addition to various application programs for image display such as content viewing, a user identification/authentication program that is executed when the user starts use of the image display device 1. Details of processing by the user identification/authentication program will be described later.

A memory 511 stores various information, such as application programs executed by the controller 501, video content played back and displayed on the display panel 509, and image data used for user authentication.

An input operation section 502 includes at least one operator for the user to perform an input operation, such as a key, a button, or a switch. The input operation section 502 accepts an instruction from the user made via the operator, and outputs the instruction to the controller 501. Likewise, the input operation section 502 accepts an instruction from the user in the form of a remote control command received by a remote control receiver 503, and outputs the instruction to the controller 501.

An environmental information acquiring section 504 acquires environmental information related to the ambient environment outside of the image display device 1, and outputs the acquired environmental information to the controller 501. As environmental information, the environmental information acquiring section 504 acquires, for example, ambient light intensity, acoustic intensity, position or location, temperature, weather, time, an ambient image, and the like. In order to acquire these pieces of environmental information, the environmental information acquiring section 504 may include various environmental sensors such as a light quantity sensor, a microphone, a global positioning system (GPS) sensor, a temperature sensor, a humidity sensor, a clock, an outside camera that is directed to the outside and shoots the scene of the outside (image of the user's view), and a radiation sensor (none of which is shown in FIG. 5). Alternatively, the image display device 1 itself may not be provided with environmental sensors, and environmental information may be acquired by the environmental information acquiring section 504 from an external device (not shown) that is equipped with environmental sensors.

A condition information acquiring section 505 acquires condition information related to the condition of a user who uses the image display device 1, and outputs the acquired condition information to the controller 501. As condition information, the condition information acquiring section 505 acquires, for example, the working condition of the user (whether or not the user is wearing the image display devices 1), the condition of an operation or action made by the user (the position of the user's head while wearing the image display device 1, the motion of the line of sight, movement such as walking, or opening and closing of the eyelid), mental condition (excitement such as whether the user is immersed or concentrated on the inside image displayed on the display panel 509 while viewing the image, vigilance, feeling, emotion, or the like), and further, physiological condition. In order to acquire these pieces of condition information, the condition information acquiring section 505 may include various condition sensors such as a wearing sensor configured by a mechanical switch or the like, a GPS sensor, a gyro sensor, an acceleration sensor, a speed sensor, a pressure sensor, a body temperature sensor, a perspiration sensor, an electromyogram sensor, an electrooculogram sensor, an electroencephalogram sensor, an inside camera directed to the inside, that is, toward the user's face, and a microphone to which vocal sound produced by the user is inputted (none of which is shown in FIG. 5). For example, the condition information acquiring section 505 is able to acquire the line of sight (motion of the eyeballs) of the user wearing the image display device 1 on the head, on the basis of information outputted from the electromyogram sensor or electrooculogram sensor, or the inside camera.

A line-of-sight input can be made by using the position or movement of the user's line of sight acquired by the condition information acquiring section 505, as coordinate input information with respect to the display screen of the display panel 509. According to the line-of-sight input, the user is able to make a direct input on the display screen in much the same way as touching the touch panel screen with a finger. While in this embodiment a user authentication process is performed by using line-of-sight input, details in this regard will be given later.

A communication section 506 performs communication with another device, and also modulation/demodulation and encoding/decoding of communication signals. For example, the communication section 506 receives an image signal to be outputted for display on the display panel 509, from an external apparatus (not shown) that serves as an image source. Image data received and then demodulated and decoded by the communication section 506, or other received data is supplied to the controller 501. The controller 501 is also able to send data to be transmitted to an external apparatus, to the outside via the communication section 506.

The configuration of the communication section 506 is arbitrary. For example, the communication section 506 may be configured in accordance with the communication standard used for the transmission/reception of data to/from an external apparatus with which to communicate. The communication standard may be in either a wired or wireless form. Examples of this communication standard include contactless communication and intra-body communication typically represented by a mobile high-definition link (MHL), a universal serial bus (USB), a high definition multimedia interface (HDMI), Bluetooth (registered trademark) communication, infrared communication, Wi-Fi (registered trademark), Ethernet (registered trademark), and near field communication (NFC). The image display device 1 is also able to use a cloud computer (not shown) by connecting to a wide area network such as the Internet via the communication section 506. For example, in a case where a user identification/authentication process is partially or entirely executed on a cloud computer, the controller 501 transmits information necessary for the process to the cloud computer from the communication section 506.

An image processing section 507 further performs signal processing such as image quality correction on an image signal outputted from the controller 501, and also converts the image signal to a resolution suited for the screen of the display panel 509. Then, a display driver 508 sequentially selects pixels in the display panel 509 row by row, followed by line-sequential scanning, and supplies pixel signals based on image signals on which signal processing has been performed.

The display panel 509 is configured by, for example, a micro display such as an organic EL element or a liquid crystal display. The display panel 509 displays an inside image that can be seen from the side of the user wearing the image display device 1 as shown in FIG. 2 or FIG. 4. A virtual image optical section 510 enlarges and projects the image displayed on the display panel 509 so that the image is observed by the user as an enlarged virtual image.

In the case of the image display device 1 of a translucent type, the virtual image optical section 510 is configured by, for example, a diffraction optical element (see, for example, Japanese Unexamined Patent Application Publication No. 2012-88715). In the case of the image display device 1 of an opaque type, the virtual image optical section 510 is configured by an eyepiece optical lens (see, for example, Japanese Unexamined Patent Application Publication No. 2012-141461).

In a case where the image display device 1 is of a binocular type, the display panel 509 and the virtual image optical section 510 are provided for each of left and right eyes, and in a case where the image display device 1 is of a monocular type, the display panel 509 and the virtual image optical section 510 are provided for only one eye.

B. User Authentication Process

Although not shown in FIG. 5, the image display device 1 may be equipped with a multi-function terminal function such as a smartphone. Further, the image display device 1 is intended for regular use by users in their daily lives, offering significant added value other than content viewing. In such a case, it is assumed that various types of information including secret information are stored within the information display device 1. Accordingly, it is important to ensure security control such as checking the authenticity of a user who uses the image display device 1.

In the field concerned, authentication methods based on input of personal identification numbers or passwords are in widespread use. However, people tend to forget a personal identification number or password that is made up of a meaningless string of random letters, and if the personal identification number or password is written down somewhere, there is a risk that such information may leak. In addition, in the case of an authentication system that makes a user enter a personal identification number on a touch panel screen that is exposed to the outside world, there is a risk that the personal identification number may be discovered by a third person who is behind or near the user.

In this regard, this embodiment uses, instead of a ten key, an input screen including a combination of a number of images as an authentication screen used during log-in. Various images are included in the input screen, such as people's faces, animals such as pets, and buildings such as houses or office buildings. In the case of an input screen including face images of multiple people, a so-called group photograph may be used for the input screen. At least one of a number of images included in the input screen is inserted as a user authentication image, or marked as a user authentication image. Multiple images within the input screen other than such a user authentication image serve as decoys for tricking a third person.

Instead of entering a string of letters only the user himself/herself knows such as a personal identification number or a password with a ten key, the user selects a user authentication image only the user himself/herself can know from within the input screen. On the side of the image display device 1 (that is, the authentication system), it is checked whether or not the user has successfully selected the correct user authentication image to thereby check user's authenticity. A user authentication image is an image the user remembers well or is familiar with, and as such, the user can correctly identify the user authentication image. To the contrary, it is difficult for a third person to identify a user authentication image without being tricked by other multiple images that serve as decoys.

For example, in the case of an input screen including a combination of face images, a face image (including a photograph or portrait) of a user's own friend, acquaintance (particularly from when the user was small), or relative (particularly a relative living far away from the user), a person the user likes (including a person in history or a fictitious person), or another person related to the user is inserted into the input screen as a user authentication image. Alternatively, the face of a user's acquaintance, friend, or relative included in a group photograph is marked as a user authentication image. These face images are difficult for a third person to discriminate from one another, and hence are highly secure.

In a case where the input screen includes a combination of images of animals, an image taken of a user's own pet (such as a dog, a cat, a reptile, or fish) (including a pet the user used to have in the past), an animal or plant the user likes (including a fictitious living being), or another animal related to the user is inserted into the input screen as a user authentication image, or marked within the input screen. It is difficult for a third person to determine which one is the user's own pet, and thus the resulting user authentication image is likewise highly secure. Alternatively, an image of not a pet but a plant related to the user, such as an ornamental plant the user has been raising may be used as a user authentication image.

In a case where the input screen includes a combination of images of buildings, an image taken of a familiar building such as a user's house (including a house the user used to live in the past), a school the user went to, or a user's office (including a company the user used to work in the past), or an image of a building the user likes (including a fictitious building) is inserted into the input screen as a user authentication image, or marked within the input screen. It is difficult for a third person to determine which one is the building of the user's house, the school the user went to, or the user's office, and thus the resulting user authentication image is likewise highly secure.

Moreover, unlike a personal identification number or a password, the user hardly forgets an image of his/her own acquaintance, friend, pet, ornamental plant, or house. Therefore, there will be virtually no chance of the user being tricked by other decoy images. It can be said that avoiding forgetfulness is also one of the advantages of using an input screen including a user authentication image as an authentication screen.

In a case where people's face images are used for the input screen, an actual group photograph of an entrance ceremony, a graduation ceremony, a group tour, or the like may be used for the input screen. Alternatively, an input screen for authentication may be created by collecting face images of people the user does not know from a cloud computer or the like, and inserting a user authentication image such as an image of a user's acquaintance, friend, or relative among those face images.

Likewise, in a case where images of animals are used for the input screen, an input screen for authentication may be created by collecting images of the appearances of a number of animals from a cloud computer or the like, and inserting a user authentication image that is an image of the appearance of a user's pet among those images. In a case where the user's pet is a small-breed dog, creating an input screen by collecting images of small-breed dogs of the same species makes the user authentication image buried under other similar images within the input screen and hard to distinguish for a third person who does not know how the user's pet actually looks like, thereby further increasing security.

Each of images (including a user authentication image) included in the input screen may be an actual image (actual photographed image), a synthetic image generated by computer graphics, or an image based on hand-drawing.

The number of user authentication images inserted into or marked within the input screen may be one or multiple. The number of user authentication images may be determined by random numbers. If the user is authentic, even when the number of user authentication images is unclear, the user can correctly identify each user authentication image because the image is familiar to the user. To the contrary, unless the number of user authentication images is clear, a third person is easily confused and tricked by other images that serve as decoys. Therefore, the precision of authentication can be increased.

Further, the locations in which to place or the sizes in which to display multiple images (including a user authentication image) within the input screen may be controlled by random numbers. If the user is authentic, even if the location or size of a user authentication image changes, the user is able to follow this change without being fooled. To the contrary, a third person is confused by the location or size of the user authentication image, and is likely to be tricked by other images that serve as decoys. Therefore, the precision of authentication can be increased.

Rather than letting the user complete authentication upon selecting a user authentication image after a single attempt, that is, on a single input screen, by providing multiple attempts, that is, multiple input screens, and making the user perform authentication by repeating the operation of selecting a user authentication image, the authentication can be made harder to crack for a third person, thereby improving security level. Of course, authentication using an input screen including multiple images may be combined with other authentication methods.

FIG. 6 schematically shows a functional configuration for the image display device 1 to perform a user authentication process by using an input screen.

An input screen generator 601 generates an input screen that is used as an authentication screen. As previously described, the input screen includes a combination of multiple images. Various images are included in the input screen, such as face images of people, images of animals such as pets, and images of buildings such as houses or office buildings. In the case of an input screen including face images of people, a so-called group photograph may be also used.

An image database 611 stores a number of images that can be used for the input screen and each serve as a decoy for a user authentication image. The image database 611 also stores images of group photographs of people or the like that can be used for the input screen. Such group photographs include those which do not include user authentication images, and those which include user authentication images inserted in advance.

For example, the image database 611 is constructed within the memory 511 of the image display device 1. Alternatively, the image database 611 may not necessarily be provided within the image display device 1 but, for example, the image database 611 may exist on a cloud computer on a network. In the latter case, for example, the image display device 1 may access the cloud computer via the communication section 506, and acquire necessary images.

A user authentication image database 612 stores images that can be inserted into the input screen for use as user authentication images. A user authentication image is, for example, a face image of a user's friend, acquaintance (particularly from when the user was small), or relative (particularly a relative living far away from the user), an image of a user's pet (such as a dog, a cat, a reptile, or fish), or an image of a familiar building such as a user's house (including a house the user used to live in in the past), a school the user went to, or a user's office.

If there is an image the user wants to use for his/her own authentication process, the user may simply register such an image in the user authentication image database 612 in advance. In a case where a single image display device 1 is to be shared by multiple users, the user authentication image database 612 may manage user authentication images for each individual user.

For example, the user authentication image database 612 is constructed within the memory 511 of the image display device 1. Alternatively, the user authentication image database 612 may not necessarily be provided within the image display device 1 but, for example, the user authentication image database 612 may exist on a cloud computer on a network. In the latter case, for example, the image display device 1 may access the cloud computer via the communication section 506, and acquire a necessary user authentication image.

The input screen generator 601 extracts a user authentication image for the user attempting to start using the image display device 1, from the user authentication image database 612, and also extracts multiple images that serve as decoys for the user authentication image from the image database 611. Then, the input screen generator 601 places these multiple images in accordance with a predetermined rule or randomly to thereby generate an input screen used as an authentication screen. Alternatively, the input screen generator 601 may automatically extract a user authentication image from the user authentication image database 612, or the user may manually extract a user authentication image as pre-processing. Details of an input screen generated in this way may be described later.

In a case where a so-called group photograph is used as an authentication screen, the input screen generator 601 replaces an image of at least one person or the like included in the group photograph, with a user authentication image. Alternatively, when an image of a person which serves as a user authentication image already appears in the group photograph, the location of the image is marked. The replacing of at least one image in the group photograph with a user authentication image, or the marking of a user authentication image may be performed automatically by the input screen generator 601, or may be performed manually by the user as pre-processing.

The input screen generator 601 marks a user authentication image inserted into the input screen, or at least one image already included in the input screen, as a user authentication image. For example, a marking may be applied by using a digital watermarking technology. If a user authentication image is marked, in the subsequent authentication process, it is possible to determine which image is a user authentication image directly from the input screen itself by detecting a marking such as digital watermarking.

An input screen display 602 displays an input screen generated by the input screen generator 601, as an authentication screen. The input screen display 602 may display an input screen not only as a still image but also as a moving image. For example, the input screen display 602 may change the locations in which to place various images (including a user authentication image) and the sizes of these images within the input screen from moment to moment. If the user is authentic, even if the location or size of a user authentication image changes, the user is able to follow this change without being fooled. To the contrary, a third person is confused by the location or size of the user authentication image, and is likely to be tricked by other images that serve as decoys. Therefore, the precision of authentication can be increased.

In the case of the image display device 1, the input screen is outputted for display on the display panel 509. In a case where the technology disclosed in this specification is applied to a multi-function terminal such as a tablet or smartphone, the input screen is outputted for display on a touch panel screen.

A user authentication image selecting section 603 extracts an image selected by the user as a user authentication image, from within the input screen displayed on the input screen display 602, and outputs the image to a user authentication section 604 in the subsequent stage.

In the case of the image display device 1 that is worn on the head or face of the user, the user authentication image selecting section 603 may select a user authentication image from within the input screen through line-of-sight input, for example, the position of the point of regard of the user or movement of the point of regard. In the case of using line-of-sight input, whether or not a user authentication image has been selected may be determined on the basis of the degree of match with a signal or characteristic pattern in which the movement of the user's line of sight is registered in advance. Alternatively, the user may indicate start or end of selection of a user authentication image by opening and closing (blinking) of the eyes.

Of course, the user may select a user authentication image by a method other than line-of-sight input. In a case where the technology disclosed in this specification is applied to a personal computer, the user authentication image selecting section 603 selects a user authentication image on the basis of user's mouse operation. In the case of a multi-function terminal equipped with a touch panel such as a tablet or a smartphone, the user authentication image selecting section 603 selects a user authentication image on the basis of user's tap operation on the touch panel that is displaying an input screen. In the case of a cellular phone, the user authentication image selecting section 603 selects a user authentication image on the basis of user's operation of a four-direction button and an Enter button equipped to the phone. In the case of a television receiver, the user authentication image selecting section 603 selects a user authentication image on the basis of user's operation using a cross key of a remote control, for example.

The user authentication section 604 verifies whether or not the image selected by the user authentication image selecting section 603 is a user authentication image, and checks whether or not the user is an authentic user on the basis of the results of the verification. Then, the user authentication section 604 notifies an application execution permitting section 605 of the results of the user authentication process.

In a case where a marking such as digital watermarking is applied to a user authentication image, the user authentication section 604 can directly detect whether or not the image in question is a user authentication image by performing a marking detection process. Alternatively, the user authentication section 604 may query the user authentication image database 612 (or a cloud computer that manages the user authentication image database 612) for the corresponding image to thereby verify whether or not the image is a user authentication image.

When the application execution permitting section 605 receives from the user authentication section 604 an indication that the user authentication process has succeeded, the application execution permitting section 605 permits execution of an application in response to an instruction to execute the application subsequently made by the user, such as viewing of content on the image display device 1. When the application execution permitting section 605 receives from the user authentication section 604 an indication that the user authentication has failed, the application execution permitting section 605 rejects any instruction to execute an application subsequently made by the user.

By employing the functional configuration shown in FIG. 6, presentation of an input screen, and an authentication process based on selection of a user authentication image may be attempted not only once but repeatedly multiple times. By providing multiple attempts, that is, multiple input screens, and performing an authentication process by making the user repeat the operation of selecting a user authentication image, the authentication can be made harder to crack for a third person, thereby improving security level. Of course, an authentication process using an input screen may be combined with other authentication methods.

Figure 7A:
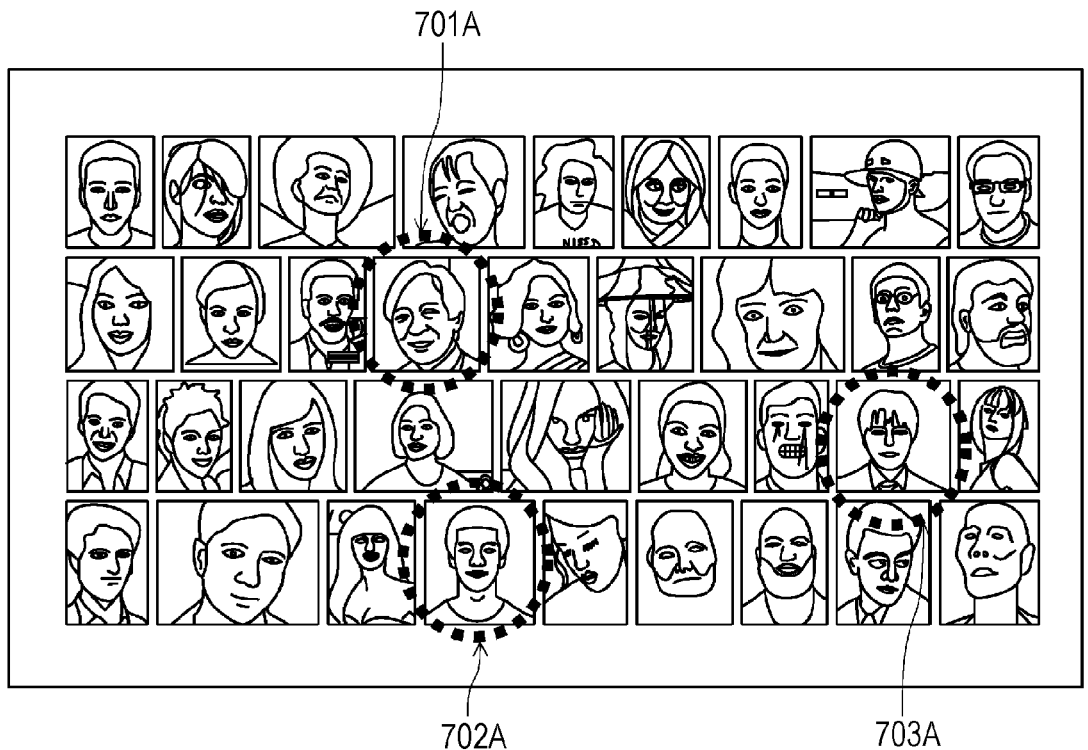
FIG. 7A shows an example of display of an input screen including a combination of face images.

FIG. 7A shows an example of display of an input screen including a combination of face images. In FIG. 7A, for the convenience of explanation, face images that serve as user authentication images are encircled by dotted lines, as indicated by reference numerals 701A, 702A, and 703A. Each of the user authentication images is a face image of a user's own friend, acquaintance (particularly from when the user was small), or relative (particularly a relative living far away from the user), or a face image of another person related to the user. The face images other than the user authentication images are extracted randomly from the image database 611, and are placed in locations or display sizes that are determined by the input screen generator 601 on the basis of random numbers. Of course, when this screen is displayed as an input screen on the display panel 509 or the like, the dotted lines are not displayed, which makes it difficult for a third person to guess which images are user authentication images.

Figure 7B:
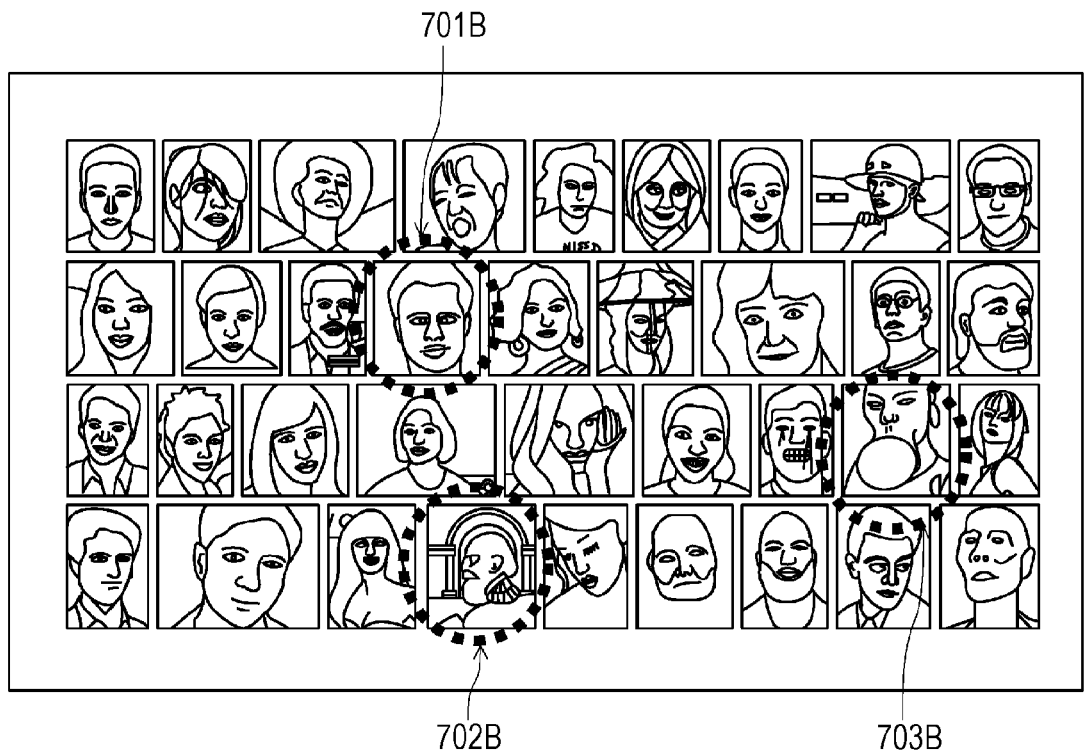
FIG. 7B illustrates a combination of face images prior to insertion of user authentication images, which serves as the basis for the input screen shown in FIG. 7A.

Depending on the case, the image shown in FIG. 7A may be an original image, or another original image may exist as shown in FIG. 7B. Depending on the case, an original image (source image/master image, for example, a graduation photograph of a friend owned by the user himself/herself) may be marked and used as it is, or another original image may exist (for example, a group photograph in which there is no user's acquaintance) and the face image of a user's acquaintance is inserted into the image. FIG. 7B illustrates an input screen prior to insertion of user authentication images, in which multiple face images extracted from the image database 611 are placed. For the convenience of explanation, the locations where user authentication images will be inserted later are encircled by dotted lines, as indicated by reference numerals 701B, 702B, and 703B. The locations in which to insert user authentication images or the sizes in which to display user authentication images may be automatically controlled by the input screen generator 601 by using random numbers or the like, or may be determined manually by the user as pre-processing. As shown in FIG. 7A, the input screen generator 601 inserts the user authentication images 701A, 702A, and 703A extracted from the user authentication image database 612 into the locations 701B, 702B, and 703B in FIG. 7B, respectively. The input screen generator 601 may automatically select, from the user authentication image database 612, face images to be used as user authentication images within the input screen, by using random numbers or the like from among multiple face images associated with the user. Alternatively, such face images may be selected manually by the user as pre-processing. In addition, the input screen generator 601 applies a marking to each of the face images serving as user authentication images by digital watermarking or the like.

Figure 8A:
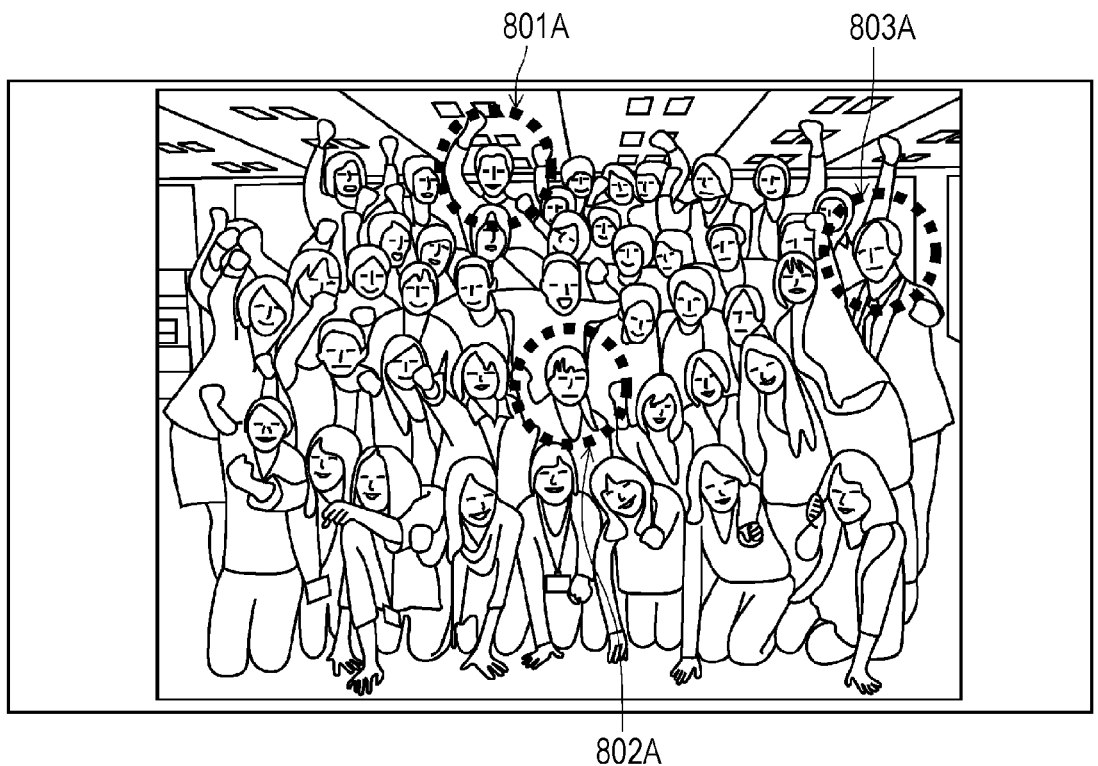
FIG. 8A shows an example of an input screen including a group photograph.

FIG. 8A shows an example of an input screen including a group photograph. In FIG. 8A, for the convenience of explanation, face images that serve as user authentication images within the group photograph are encircled by dotted lines, as indicated by reference numerals 801A, 802A, and 803A. Each of the user authentication images is a face image of a user's own friend, acquaintance (particularly from when the user was small), or relative (particularly a relative living far away from the user), or a face image of another person related to the user. Of course, when this screen is displayed as an input screen on the display panel 509 or the like, the dotted lines are not displayed, which makes it difficult for a third person to guess which images are user authentication images.

Figure 8B:
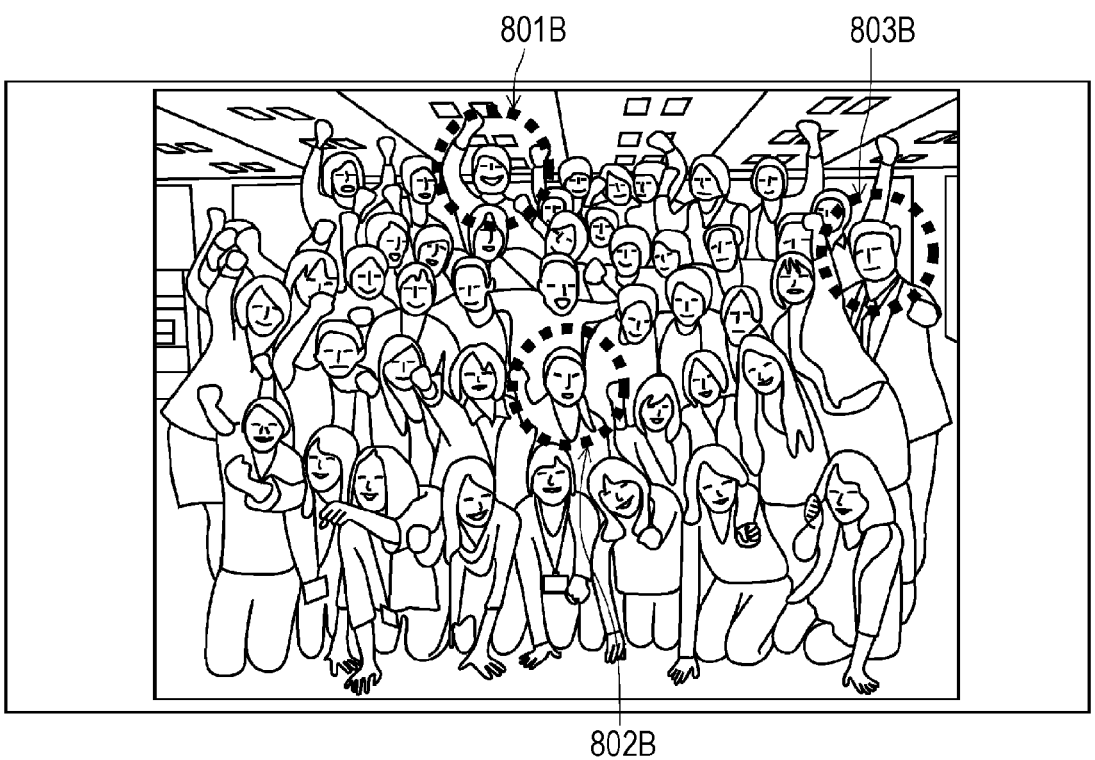
FIG. 8B illustrates a group photograph prior to insertion of user authentication images, which serves as the basis for the input screen shown in FIG. 8A.

Depending on the case, the image shown in FIG. 8A may be an original image, or another original image may exist as shown in FIG. 8B. FIG. 8 shows an example of a group photograph prior to insertion of user authentication images, which serves as the basis for the input screen shown in FIG. 8A. For the convenience of explanation, the locations where user authentication images will be inserted later are encircled by dotted lines, as indicated by reference numerals 801B, 802B, and 803B. The locations 801B, 802B, and 803B in which to insert user authentication images (that is, images of people within the group photograph which are to be replaced by user authentication images) may be automatically controlled by the input screen generator 601 by using random numbers or the like, or may be determined manually by the user as pre-processing. When displaying user authentication images, the size of each of the user authentication images is determined on the basis of, for example, the size of a person's image previously displayed before being replaced by the corresponding authentication image. When the input screen generator 601 extracts an arbitrary group photograph from the image database 611, as shown in FIG. 8A, the input screen generator 601 inserts the user authentication images 801A, 802A, and 803A extracted from the user authentication image database 612 into the locations 801B, 802B, and 803B in FIG. 8B, respectively. The input screen generator 601 may automatically select, from the user authentication image database 612, face images to be used as user authentication images, by using random numbers or the like from among multiple face images associated with the user. Alternatively, such face images may be selected manually by the user as pre-processing. The input screen generator 601 applies a marking to each of the face images serving as user authentication images by digital watermarking or the like. In a case where a group photograph including user authentication images is to be used in the first place, it is not necessary for the input screen generator 601 to insert the user authentication images into the group photograph again. Instead, the input screen generator 601 may simply mark the user authentication images within the group photograph.

FIG. 9 shows an example of display of an input screen including a combination of images of animals. In FIG. 9, for the convenience of explanation, images of animals that serve as user authentication images are encircled by dotted lines, as indicated by reference numerals 901, 902, and 903. Each of the user authentication images is an image taken of a user's own pet (such as a dog, a cat, a reptile, or fish) (including a pet the user used to have in the past), or another animal related to the user. The images of animals other than the user authentication images are extracted randomly from the image database 611, and are placed in locations or display sizes that are determined by the input screen generator 601 on the basis of random numbers. Of course, when this screen is displayed as an input screen on the display panel 509 or the like, the dotted lines are not displayed, which makes it difficult for a third person to guess which images are user authentication images.

The locations in which to insert user authentication images or the sizes in which to display user authentication images may be automatically controlled by the input screen generator 601 by using random numbers or the like, or may be determined manually by the user as pre-processing. As shown in FIG. 9, the input screen generator 601 inserts the user authentication images extracted from the user authentication image database 612 into the corresponding locations 901, 902, and 903. The input screen generator 601 may automatically select, from the user authentication image database 612, images of animals to be used as user authentication images within the input screen, by using random numbers or the like from among multiple images of animals associated with the user. Alternatively, such images of animals may be selected manually by the user as pre-processing. In addition, the input screen generator 601 applies a marking to each of the images of animals serving as user authentication images by digital watermarking or the like.

Figure 10:
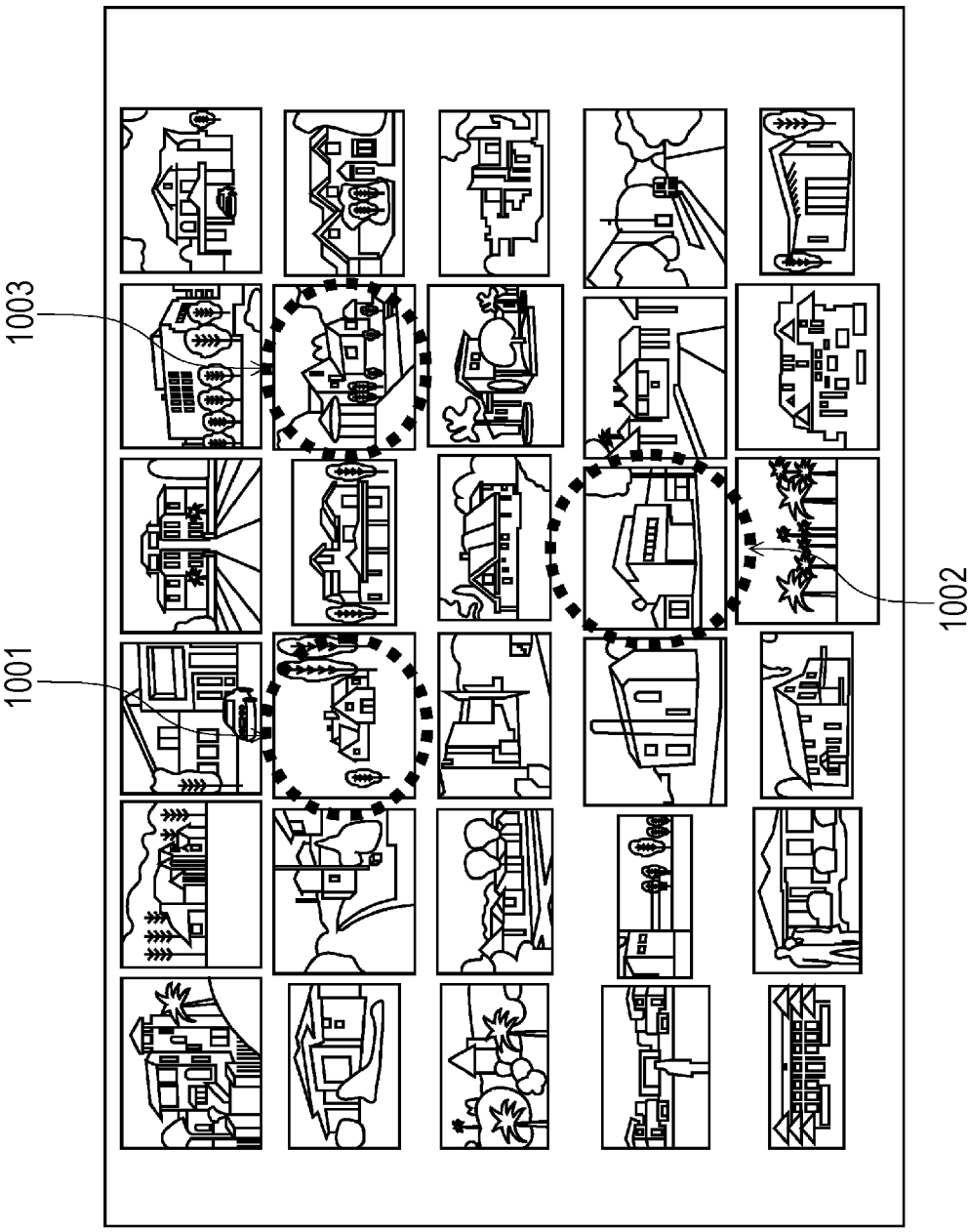
FIG. 10 shows an example of display of an input screen including a combination of images of buildings.

FIG. 10 shows an example of display of an input screen including a combination of images of buildings. In FIG. 10, for the convenience of explanation, images of buildings that serve as user authentication images are encircled by dotted lines, as indicated by reference numerals 1001, 1002, and 1003. Each of the user authentication images is an image taken of a familiar building, such as a user's house (including a house the user used to live in in the past), a school the user went to, or a user's office (including a company the user used to work in the past). The images of buildings other than the user authentication images are extracted randomly from the image database 611, and are placed in locations or display sizes that are determined by the input screen generator 601 on the basis of random numbers. Of course, when this screen is displayed as an input screen on the display panel 509 or the like, the dotted lines are not displayed, which makes it difficult for a third person to guess which images are user authentication images.

The locations in which to insert user authentication images or the sizes in which to display user authentication images may be automatically controlled by the input screen generator 601 by using random numbers or the like, or may be determined manually by the user as pre-processing. As shown in FIG. 10, the input screen generator 601 inserts the user authentication images extracted from the user authentication image database 612 into the corresponding locations 1001, 1002, and 1003. The input screen generator 601 may automatically select, from the user authentication image database 612, images of buildings to be used as user authentication images within the input screen, by using random numbers or the like from among multiple images of buildings associated with the user. Alternatively, such images of buildings may be selected manually by the user as pre-processing. In addition, the input screen generator 601 applies a marking to each of the images of buildings serving as user authentication images by digital watermarking or the like.

Figure 11:
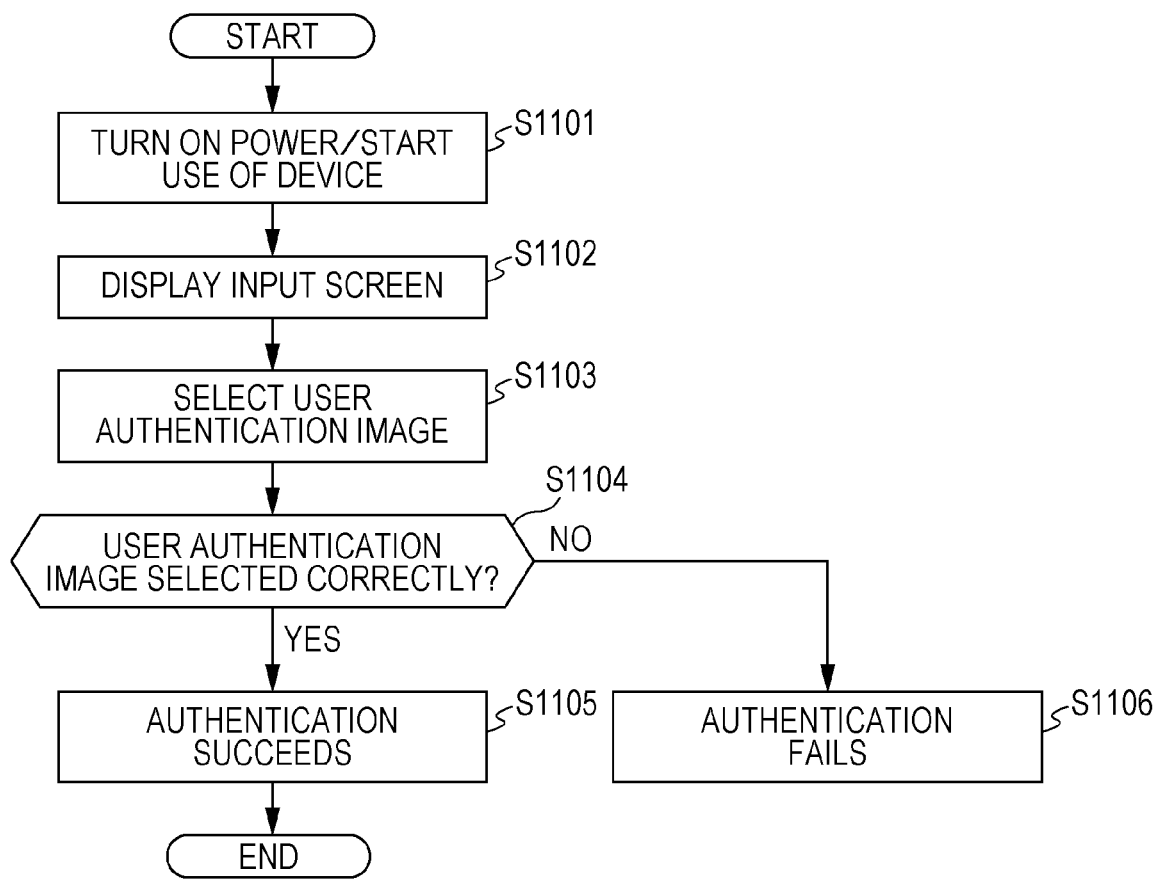
FIG. 11 is a flowchart showing an example of a procedure for the image display device to perform user authentication by using an input screen.

FIG. 11 is a flowchart showing an example of a procedure for the image display device 1 to perform user authentication by using an input screen. The procedure shown in FIG. 11 is implemented by, for example, execution of a predetermined program code by the controller 501.

When use of the image display device 1 is started by the user by, for example, turning on the power to the image display device 1 (step S1101), the input screen display 602 displays, as an initial authentication screen, an input screen including at least one user authentication image on the display panel 509 (step S1102).

The user selects a user authentication image from within the input screen by, for example, line-of-sight input (step S1103). In a case where two or more user authentication images are included in the input screen, the user selects all of the user authentication images.

The selecting operation of a user authentication image by the user is not limited to line-of-sight input. For example, in a case where the technology disclosed in this specification is applied to not the image display device 1 but a multi-function terminal such as a tablet or a smartphone equipped with a touch panel, the user is able to perform the selecting operation by making a tap operation on the touch panel that is displaying the input screen.

The user authentication image selecting section 603 detects which image within the input screen the user has selected, and notifies the user authentication section 604 of the results of the detection. The user authentication section 604 verifies whether or not the image selected by the user authentication image selecting section 603 is a correct user authentication image, and checks whether or not the user is authentic on the basis of the results of the verification (step S1104). Then, the user authentication section 604 notifies the application execution permitting section 605 of the results of the user authentication process.

When the application execution permitting section 605 receives from the user authentication section 604 an indication that the user authentication process has succeeded (Yes in step S1104), the application execution permitting section 605 permits execution of an application in response to an instruction to execute the application subsequently made by the user (step S1105).

When user authentication has failed (No in step S1104), the user authentication section 604 displays an indication of the failed authentication on the display panel (step S1106), and notifies the application executing permitting section 605 of the fact that the user authentication has failed. Then, the application execution permitting section 605 rejects any instruction to execute an application subsequently made by the user.

Figure 12:
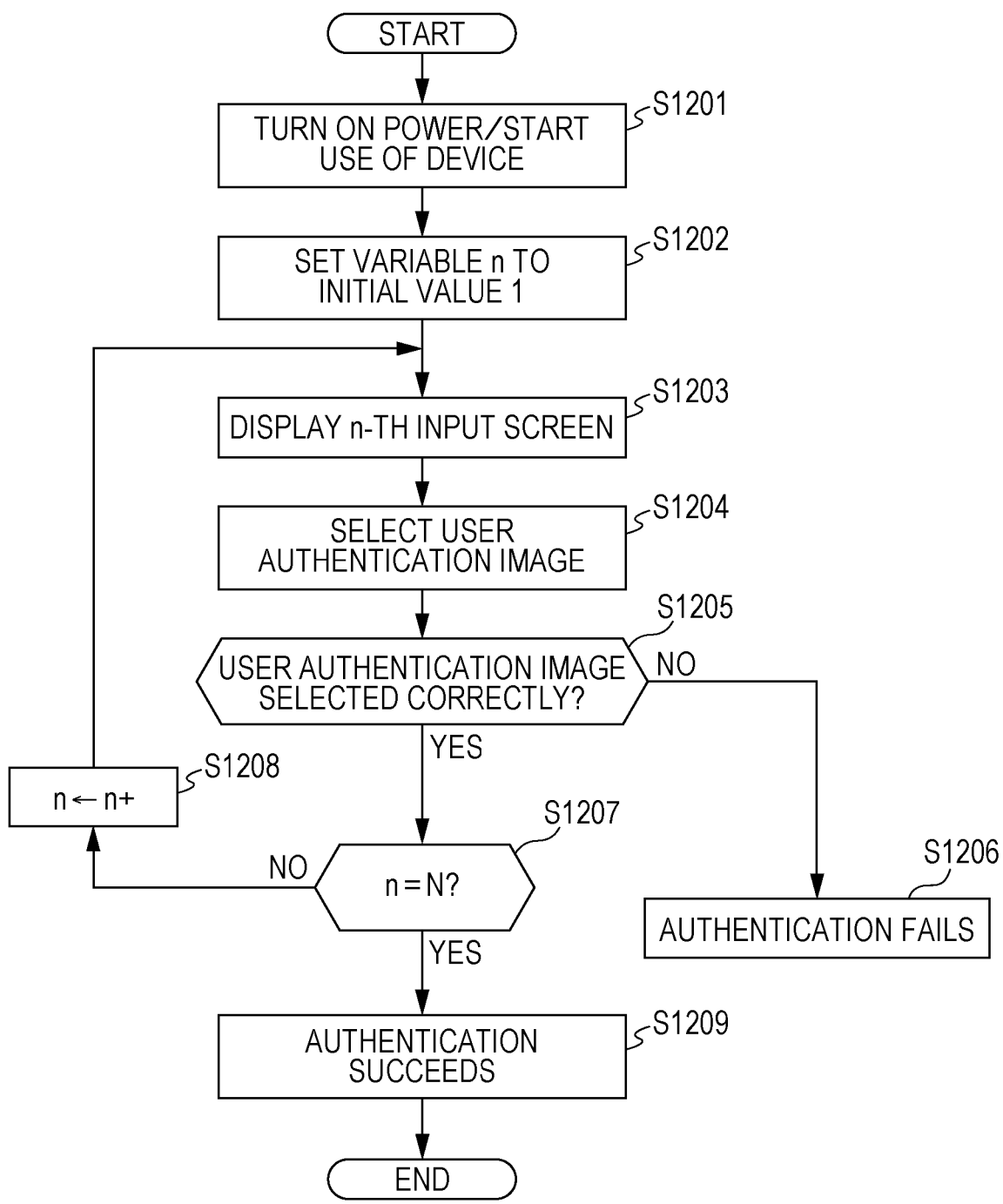
FIG. 12 is a flowchart showing another example of a procedure for the image display device to perform user authentication by using an input screen.

FIG. 12 is a flowchart showing another example of a procedure for the image display device 1 to perform user authentication by using an input screen. In the procedure shown in FIG. 12, an authentication process based on selection of a user authentication image from the input screen is attempted multiple times (hereinafter, referred to as N times), thereby improving security level. The procedure shown in FIG. 12 is implemented by, for example, execution of a predetermined program code by the controller 501.

When use of the image display device 1 is started by the user by, for example, turning on the power to the image display device 1 (step S1201), a variable n counting the number of times authentication has been attempted is set to an initial value 1 (step S1202).

The input screen display 601 displays the n-th input screen generated by the input screen generator 601, as an authentication screen for the n-th session, on the display panel 509 (step S1203).

The user selects a user authentication image from within the input screen by, for example, line-of-sight input (step S1204). In a case where two or more user authentication images are included in the n-th input screen, the user selects all of the user authentication images.

The selecting operation of a user authentication image by the user is not limited to line-of-sight input. For example, in a case where the technology disclosed in this specification is applied to not the image display device 1 but a multi-function terminal such as a tablet or a smartphone equipped with a touch panel, the user is able to perform the selecting operation by making a tap operation on the touch panel that is displaying the input screen.

The user authentication image selecting section 603 detects which image the user has selected within the n-th input screen, and notifies the user authentication section 604 of the results of the detection. The user authentication section 604 verifies whether or not the image selected by the user authentication image selecting section 603 is a user authentication image, and checks whether or not the user is authentic on the basis of the results of the verification (step S1205).

At this time, when the user selects an image other than a user authentication image, and the authentication process fails (No in step S1205), the user authentication section 604 displays an indication of the failed authentication on the display panel (step S1206), and notifies the application executing permitting section 605 of the fact that the user authentication has failed. Then, the application execution permitting section 605 rejects any instruction to execute an application subsequently made by the user.

When the user has selected all of user authentication images correctly from within the n-th input screen (Yes in step S1205), the user authentication section 604 checks whether or not the number of attempts n has reached N (step S1207).

When the number of authentication attempts has not yet reached N (No in step S1207), the user authentication section 604 increments n by 1 (step S1208), and then returns to step S1203. Thereafter, the user authentication section 604 repeatedly executes the same above-mentioned authentication process based on selection of a user authentication image.

When the number of authentication attempts has reached N (Yes in step S1207), and all the attempts have been successfully completed, the user authentication section 604 notifies the application execution permitting section 605 of the fact that the user authentication process has succeeded. Then, the application execution permitting section 605 permits execution of an application in response to an instruction to execute the application subsequently made by the user (step S1209).

Figure 13:
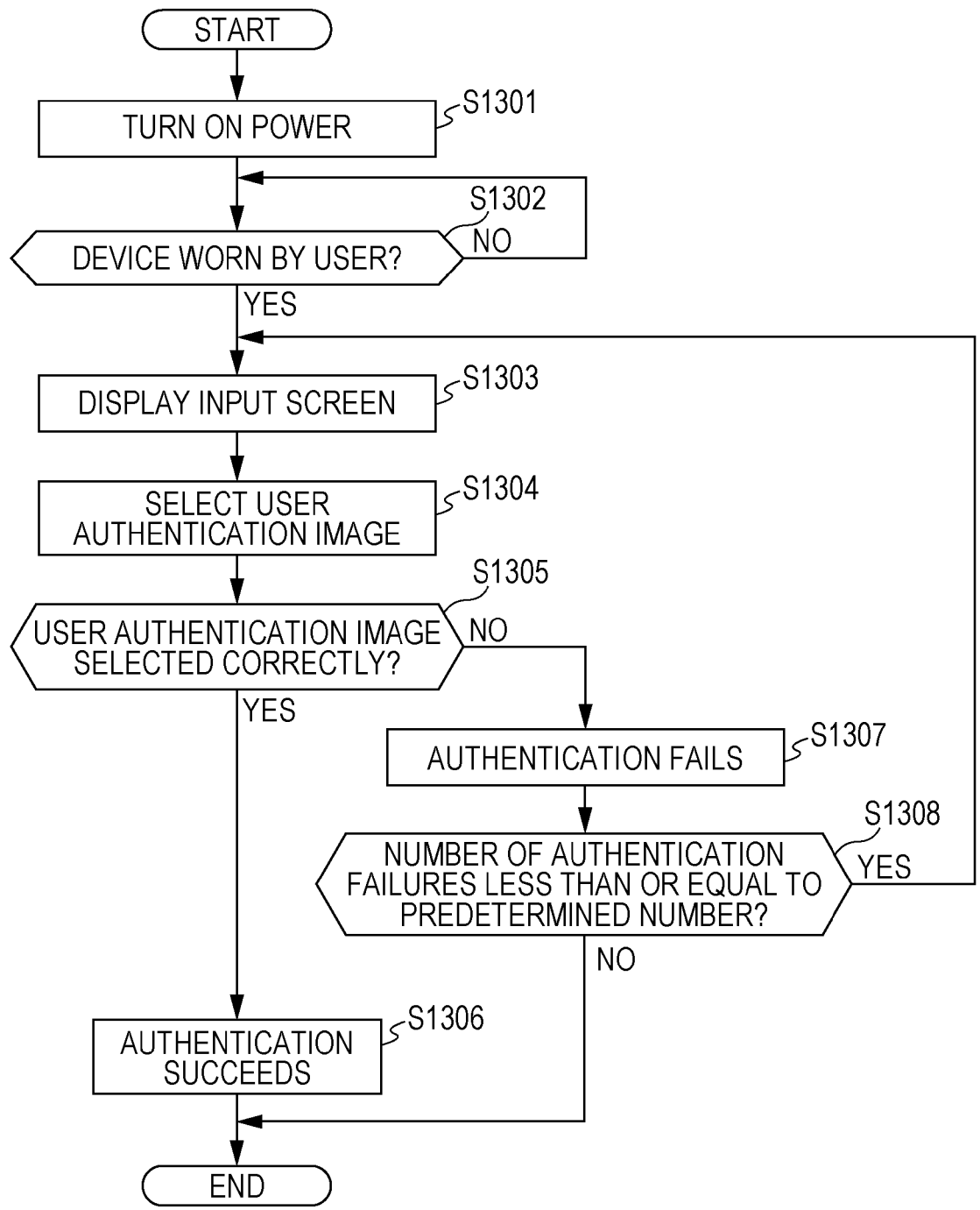
FIG. 13 is a flowchart showing still another example of a procedure for the image display device to perform user authentication by using an input screen.

FIG. 13 is a flowchart showing still another example of a procedure for the image display device 1 to perform user authentication by using an input screen. The procedure shown in FIG. 13 differs from the procedure shown in FIG. 11 in that the authentication process starts not when the power to the image display device 1 is turned on but when the user wears the image display device 1 on the head or face. In addition, the procedure shown in FIG. 13 permits a predetermined number of authentication failures. The procedure shown in FIG. 13 is implemented by, for example, execution of a predetermined program code by the controller 501.

When the power to the image display device 1 is turned on (step S1301), the processing waits until the user wears the image display device 1 on the head or face (No in step S1302).

Whether or not the user has worn the image display device 1 on the head or face can be detected by using a wearing sensor. Alternatively, the fact that the user has worn the image display device 1 on the head or face can be detected on the basis of the fact that an inside camera has captured the user's face, or on the basis of a change in the output potential of an electromyogram sensor or an electrooculogram sensor.

Then, when the user wears the image display device 1 on the head or face (Yes in S1302), the input screen display 602 displays, as an initial authentication screen, an input screen including at least one user authentication image on the display panel 509 (step S1303).

The user selects a user authentication image from within the input screen by, for example, line-of-sight input (step S1304). In a case where two or more user authentication images are included in the input screen, the user selects all of the user authentication images.

The selecting operation of a user authentication image by the user is not limited to line-of-sight input. For example, in a case where the technology disclosed in this specification is applied to not the image display device 1 but a multi-function terminal such as a tablet or a smartphone equipped with a touch panel, the user is able to perform the selecting operation by making a tap operation on the touch panel screen that is displaying the input screen.

The user authentication image selecting section 603 detects which image the user has selected within the input screen, and notifies the user authentication section 604 of the results of the detection. The user authentication section 604 verifies whether or not the image selected by the user authentication image selecting section 603 is a user authentication image, and checks whether or not the user is authentic on the basis of the results of the verification (step S1305).

When the authentication process succeeds (Yes in step S1305), the user authentication section 604 notifies the application execution permitting section 605 to that effect. When the application execution permitting section 605 receives from the user authentication section 604 an indication that the user authentication process has succeeded, the application execution permitting section 605 permits execution of an application in response to an instruction to execute the application subsequently made by the user (step S1306).

When the user authentication fails (No in step S1305), the user authentication section 604 displays an indication of the failed authentication on the display panel (step S1307). However, a predetermined number of authentication failures is permitted (for example, up to three times), and if the number of failures is within the predetermined number (Yes in step S1308), the user authentication section 604 returns to step S1303, and repeatedly executes the same above-mentioned authentication process based on selection of a user authentication image. Alternatively, once the user fails in selecting a user authentication image, the authentication process may not be allowed to succeed unless such a user authentication attempt succeeds multiple times consecutively. Alternatively, when the number of authentication failures exceeds a predetermined number (No in step S1308), user authentication is given up, and the present process routine is ended.

Now, the foregoing discussion is summarized as follows. That is, the technology disclosed in this specification is employed in view of the fact that unlike a personal identification number, a person does not easily forget the face of his/her own friend or relative, the appearance of a pet he/she adores, or the like. The technology disclosed in this specification makes the user select a specific face image or an image of a specific animal (which is related to the user) from among a number of face images or a number of images of animals, and user authentication is performed on the basis of the results of the selection. Therefore, according to the technology disclosed in this specification, it is possible to realize a convenient and highly secure authentication process. Moreover, when this technology is applied to an information processing device that is worn by the user on the head or face, user authentication can be performed more easily by use of line-of-sight input.

In the case of an embodiment where the technology disclosed in this specification is applied to the image display device 1 of a head-mounted type, the authentication screen of the input screen is displayed on the display panel 509. Then, the user can select a user authentication image by line-of-sight input, for example. In a state in which the user is wearing the image display device 1 on the head or face (see FIG. 2 or FIG. 4), it is not possible for a third person to peer at the input screen displayed on the display panel 509 itself. Of course, because the movement of the user's line of sight is also concealed from the outside world, a third person is not able to peer at a user authentication image selected by an authentic user. Moreover, the user can perform authentication at high speed through the simple operation of moving the line of sight to a user authentication image (such as a person's face) only the user knows. From these points of view, it can be said that the technology disclosed in this specification has excellent compatibility with an information processing device that is used in close contact with the user's body such as the image display device 1 of a head-mounted type.

For example, consider a situation where the user leaves the image display device 1 of a head-mounted type unattended or loses the image display device 1, and a third person wears the image display device 1 without permission. Even in this case, it is difficult for the third person to identify a user authentication image from within the input screen. Therefore, the user can use the image display device 1 with a sense of security.

In a case where a single image display device 1 is shared by multiple users, by providing an input screen including a user authentication image for each individual user, the authentication process can be performed every time each user wears the image display device 1.

Of course, the technology disclosed in this specification can be likewise applied to various other types of information processing devices featuring an image display function. In the case of a personal computer, the user selects a user authentication image with a mouse from an input screen displayed on the screen. In the case of a multi-function terminal equipped with a touch panel such as a tablet or a smartphone, the user selects a user authentication image by making a tap operation on the touch panel screen that is displaying an input screen. In the case of a cellular phone, the user selects a user authentication image by using a four-direction button and an Enter button provided to the cellular phone. In the case of a television receiver, the user selects a user authentication image by using, for example, a cross key of a remote control. In any of these cases, there is a possibility that the input screen may be exposed to the eyes of a third person. However, the user authentication image and other multiple images included in the input screen are all unfamiliar images to the third person, and therefore, the risk of the user authentication image being discovered is low.

The technology disclosed in this specification can be also configured as follows.

(1) An information processing device including: a display that displays an input screen including a plurality of images; an image selecting section that selects at least one image within the input screen in accordance with an input operation from a user; and a controller that controls the information processing device on a basis of the image selected by the image selecting section.

(2) The information processing device according to (1) mentioned above, wherein each of the plurality of images included in the input screen is one of: a photograph of a person, living being, or building; a static image; a piece of computer graphics; a piece of animation; and a moving image.

(3) The information processing device according to (1) mentioned above, wherein the input screen includes a user authentication image and an image other than the user authentication image.

(4) The information processing device according to (1) mentioned above, wherein the input screen includes a combination of a plurality of face images of people.

(5) The information processing device according to (4) mentioned above, wherein the user authentication image is one of: an image of a friend, acquaintance, or relative of the user; an image of a person the user likes, the person including a person in history or a fictitious person; and an image of another person related to the user.

(6) The information processing device according to (1) mentioned above, wherein the input screen includes a combination of a plurality of images of animals.

(7) The information processing device according to (6) mentioned above, wherein the user authentication image is one of: an image of a pet or ornamental plant of the user; an image of an animal or plant the user likes, the animal or plant including a fictitious living being; and an image of a living being related to the user.

(8) The information processing device according to (1) mentioned above, wherein the input screen includes a combination of a plurality of images of buildings.

(9) The information processing device according to (8) mentioned above, wherein the user authentication image is one of: an image of a house of the user, a school the user went to, or an office of the user; an image of a building the user likes, the building including a fictitious building; and an image of a building related to the user.

(10) The information processing device according to (1) mentioned above, wherein the input screen includes a group photograph including the user authentication image.

(11) The information processing device according to (1) mentioned above, wherein the input screen includes a group photograph that is partially replaced with the user authentication image.

(12) The information processing device according to (3) mentioned above, wherein the display controls a location in which to place or a size in which to display the user authentication image within the input screen.

(13) The information processing device according to (3) mentioned above, wherein the display controls a location in which to place or a size in which to display the user authentication image within the input screen, by a random number.

(14) The information processing device according to (3) mentioned above, wherein: the user authentication image within the input screen is marked; and the controller determines whether or not the image selected by the image selecting section is the user authentication image on a basis of whether or not the image is marked.

(15) The information processing device according to (1) mentioned above, further including an input screen generator that generates the input screen.

(16) The information processing device according to (15) mentioned above, wherein the input screen generator generates the input screen by combining the plurality of images including the user authentication image.

(17) The information processing device according to (15) mentioned above, wherein the input screen generator generates the input screen by marking at least one of the plurality of images as the user authentication image.

(18) The information processing device according to (3) mentioned above, wherein authentication of the user is performed by repeatedly attempting displaying of the input screen by the display, selecting of the image by the image selecting section, and determining of the user authentication image by the controller a predetermined number of times.

(19) The information processing device according to (1) mentioned above, wherein the information processing device is used by the user by wearing the information processing device on a head or face of the user.

(20) The information processing device according to (1) mentioned above, wherein the image selecting section selects the image from the input screen on a basis of an input of line of sight of the user.

(21) An information processing method including:
displaying an input screen including a plurality of images; selecting at least one image within the input screen in accordance with an input operation from a user; and controlling operation of an information processing device on a basis of the selected image.

(22) A computer program which is described in a computer-readable format, the computer program causing a computer to function as: a display that displays an input screen including a plurality of images; an image selecting section that selects at least one image within the input screen in accordance with an input operation from a user; and a controller that controls an information processing device on a basis of the image selected by the image selecting section.

The technology disclosed in this specification has been described above in detail with reference to specific embodiments. However, it is obvious that a person skilled in the art can make various modifications to and substitutions for the embodiments without departing from the scope of the technology disclosed in this specification.

While this specification is directed to an embodiment in which the technology disclosed in this specification is applied to a head-mounted image display device, the scope of the technology disclosed in this specification is not limited to this. The technology disclosed in this specification may be similarly applied to perform user authentication in various types of information processing devices featuring a screen display function, including multi-function terminals such as personal computers, tablets, and smartphones, cellular phones, television receivers, and the like.

In the case of a head-mounted image display device, in particular, by adopting line-of-sight input, a specific image can be selected without being discovered from the outside, and moreover, authentication can be performed at high speed by moving the line of sight. Therefore, the image display device has excellent compatibility with the technology disclosed in this specification.

That is, the technology disclosed in this specification has been described by way of examples, and should not be construed restrictively. The scope of the technology disclosed in this specification should be determined with reference to the appended claims.

The invention claimed is:

1. An information processing device comprising:
a controller having a memory, wherein a set of instructions stored in the memory cause the controller to:
extract a single group photograph, which comprises images of a plurality of objects, on an input screen;
determine a size of an image of at least one object from the images of the plurality of objects in the single group photograph, wherein the image is to be replaced with a user authentication image, wherein the user authentication image includes at least one of an actual image, a synthetic image, and/or a hand-drawn image;
replace the image by the user authentication image based on the determined size;
display the single group photograph; and
authenticate a user based on a selection of the user authentication image from the images of the plurality of objects selectable within the displayed single group photograph, wherein the authentication is performed repeatedly for a predetermined number of selections.

2. The information processing device according to claim 1, wherein each of the images of the plurality of objects included in the input screen is one of: a photograph of a person, living being, or building; a static image; a piece of computer graphics; a piece of animation; and a moving image.

3. The information processing device according to claim 1, wherein the input screen comprises: the user authentication image and the image of the at least one object other than the user authentication image.

4. The information processing device according to claim 1, wherein the user authentication image includes at least one of an image of a friend, an image of an acquaintance, an image of a relative of the user, an image of a person the user likes, an image of a person in history the user likes, an image of a fictitious person the user likes, and/or an image of another person related to the user.

5. The information processing device according to claim 1, wherein the user authentication image includes at least one of an image of a pet of the user, an image of an ornamental plant of the user, an image of an animal the user likes, an image of a plant the user likes, an image of a fictitious animal the user likes, an image of a fictitious plant the user likes, and/or an image of a living being related to the user.

6. The information processing device according to claim 1, wherein the user authentication image includes at least one of an image of a house of the user, an image of a school the user went to, an image of an office of the user, an image of a building the user likes, an image of a fictitious building the user likes, and/or an image of a building related to the user.

7. The information processing device according to claim 1, wherein the controller is further configured to partially replace the single group photograph with the user authentication image.

8. The information processing device according to claim 1, wherein the controller is further configured to control a location in which to place or configured to control a size in which to display the user authentication image within the input screen.

9. The information processing device according to claim 1, wherein the controller is further configured to control a location in which to place or configured to control a size in which to display the user authentication image within the input screen, by a random number.

10. The information processing device according to claim 1, wherein:
the controller is further configured to determine whether or not the user authentication image is selected based on a detection of a digital watermark in the user authentication image.

11. The information processing device according to claim 1, wherein the controller is further configured to generate the input screen.

12. The information processing device according to claim 11, wherein the controller is further configured to generate the input screen by combining the single group photograph and the user authentication image.

13. The information processing device according to claim 11, wherein the controller is configured to generate the input screen by marking another object from the plurality of objects in the single group photograph as the user authentication image.

14. The information processing device according to claim 1, wherein the authentication of the user is performed by repeatedly attempting the display of the single group photograph on the input screen, the selection of user authentication image in the single group photograph, and determination of whether or not the user authentication image is selected a predetermined number of times.

15. The information processing device according to claim 1, wherein the information processing device is used by the user wearing the information processing device on a head or face of the user.

16. The information processing device according to claim 1, wherein the controller is further configured to select the user authentication image in the displayed single group photograph on a basis of an input of line of sight of the user.

17. An information processing method comprising:
in an information processing device:
extracting a single group photograph, which comprises images of a plurality of objects, on an input screen;
determining a size of an image of at least one object from the images of the plurality of objects in the single group photograph, wherein the image is to be replaced with a user authentication image, wherein the user authentication image includes at least one of an actual image, a synthetic image, and/or a hand-drawn image;
replacing the image by the user authentication image based on the determined size;
displaying the single group photograph; and
authenticating a user based on a selection of the user authentication image from the images of the plurality of objects selectable within the displayed single group photograph, wherein the authentication is performed repeatedly for a predetermined number of selections.

18. A non-transitory computer-readable storage medium having stored thereon, a set of computer executable instructions for causing a computer to execute steps comprising:
extracting a single group photograph, which comprises images of a plurality of objects, on an input screen;
determining a size of an image of at least one object from the images of the plurality of objects in the single group photograph, wherein the image is to be replaced with a user authentication image, wherein the user authentication image includes at least one of an actual image, a synthetic image, and/or a hand-drawn image;
replacing the image by the user authentication image based on the determined size;
displaying the single group photograph; and
authenticating a user based on a selection of the user authentication image from the images of the plurality of objects selectable within the displayed single group photograph, wherein the authentication is performed repeatedly for a predetermined number of selections.

19. The information processing device according to claim 1, wherein the controller is further configured to:
determine the size of the user authentication image; and
display the user authentication image in the single group photograph based on the determined size of the image of the at least one object and the determined size of the user authentication image.

* * * * *